(12) United States Patent
Kanner et al.

(10) Patent No.: US 8,141,699 B2
(45) Date of Patent: *Mar. 27, 2012

(54) CONTACT LENS CASE

(75) Inventors: Rowland W. Kanner, Guntersville, AL (US); Richard M. Davis, Huntsville, AL (US); Brian Roberts, Owens Cross Roads, AL (US)

(73) Assignee: Atrion Medical Products, Inc., Arab, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,478

(22) Filed: Nov. 11, 2010

(65) Prior Publication Data

US 2011/0073497 A1 Mar. 31, 2011

Related U.S. Application Data

(63) Continuation-in-part of application No. 12/027,319, filed on Feb. 7, 2008.

(60) Provisional application No. 61/366,445, filed on Jul. 21, 2010.

(51) Int. Cl.
  *A61L 12/00* (2006.01)
  *A45C 11/00* (2006.01)
(52) U.S. Cl. .................................. 206/5.1; 134/901
(58) Field of Classification Search .............. 206/5.1, 206/804, 806; 294/1.2; 134/901; 215/260, 215/270; 220/203.11, 203.19, 367.1
See application file for complete search history.

(56) References Cited

U.S. PATENT DOCUMENTS

| | | | |
|---|---|---|---|
| 3,770,113 A | 11/1973 | Thomas | |
| 4,009,777 A | 3/1977 | Thomas | |
| 4,011,941 A | 3/1977 | Parsons | |
| 4,013,410 A | 3/1977 | Thomas et al. | |
| 4,200,187 A | 4/1980 | Thomas | |
| 4,396,583 A * | 8/1983 | LeBoeuf | 422/301 |
| 4,637,919 A | 1/1987 | Ryder et al. | |
| 4,750,610 A | 6/1988 | Ryder | |

(Continued)

FOREIGN PATENT DOCUMENTS

EP 0 354 876 A1 2/1990

(Continued)

OTHER PUBLICATIONS

Extended European Search Report and Opinion which issued in connection with corresponding European Application No. 08729233.0 on Jan. 31, 2011.

(Continued)

*Primary Examiner* — Steven A. Reynolds
(74) *Attorney, Agent, or Firm* — Clark Hill PLC

(57) ABSTRACT

An improved contact lens case which includes domes that are provided on hinged members. Preferably, the contact lens case is configured to efficiently utilize space and volume such that no more than 10 cc's of contact lens solution are required to disinfect contact lenses in the case. The hinged members are preferably non-planar which allows the domes to be provided on the hinged members, and allows the use of deep larger diameter, back-to-back cages on the stem, without having to resort to using more than 10 cc's of fluid to immerse contact lenses that are disposed on the domes, between each of the domes and a respective cage. Each of the hinged members has a cylindrically-curved shell form in which the axis of its curve is approximately parallel to the central axis of the central planar stem member.

20 Claims, 41 Drawing Sheets

U.S. PATENT DOCUMENTS

| | | | | |
|---|---|---|---|---|
| 4,807,750 | A | 2/1989 | Ryder et al. | |
| 4,817,998 | A | 4/1989 | Ryder et al. | |
| 4,889,693 | A | 12/1989 | Su et al. | |
| 4,890,729 | A | 1/1990 | Ranalletta | |
| 4,956,156 | A | 9/1990 | Kanner et al. | |
| 4,981,657 | A | 1/1991 | Ryder | |
| 4,996,027 | A | 2/1991 | Kanner | |
| 5,059,402 | A | 10/1991 | Seamons et al. | |
| 5,143,104 | A | 9/1992 | Iba et al. | |
| 5,186,317 | A * | 2/1993 | Ryder et al. | 206/5.1 |
| 5,196,174 | A | 3/1993 | Cerola et al. | |
| 5,250,266 | A | 10/1993 | Kanner | |
| 5,292,488 | A | 3/1994 | Cerola et al. | |
| 5,306,352 | A | 4/1994 | Nicolson et al. | |
| 5,366,078 | A | 11/1994 | Braun | |
| 5,468,448 | A | 11/1995 | Nicolson et al. | |
| 5,558,846 | A | 9/1996 | Alvord et al. | |
| 5,605,667 | A * | 2/1997 | Powell, Jr. | 422/119 |
| 5,609,837 | A | 3/1997 | Cerny et al. | |
| 5,690,211 | A | 11/1997 | Jao et al. | |
| 5,759,540 | A | 6/1998 | Nielsen | |
| 5,958,351 | A | 9/1999 | Cerny et al. | |
| 6,148,992 | A | 11/2000 | Kanner et al. | |
| 2001/0017271 | A1 | 8/2001 | Yavitz | |
| 2003/0066764 | A1 * | 4/2003 | Scherer et al. | 206/5.1 |
| 2005/0087453 | A1 | 4/2005 | Mahieu et al. | |
| 2005/0263412 | A1 | 12/2005 | Huang | |
| 2006/0102496 | A1 | 5/2006 | Christy et al. | |
| 2008/0185298 | A1 | 8/2008 | Kanner et al. | |

FOREIGN PATENT DOCUMENTS

WO 92/09942 A1 6/1992

OTHER PUBLICATIONS

Extended European Search Report which issued in connection with corresponding European patent application No. 11174457 on Oct. 26, 2011.

* cited by examiner

CONTACT LENS CASE

RELATED APPLICATIONS

Priority Claim

This application claims the benefit of U.S. Provisional Application Ser. No. 61/366,445, filed Jul. 21, 2010, and is a continuation-in-part of U.S. patent application Ser. No. 12/027,319, filed Feb. 7, 2008. Both applications are hereby incorporated herein by reference in their entirety.

BACKGROUND

The present invention generally relates to contact lens cases.

U.S. Pat. No. 3,770,113 (Thomas) discloses a prior art contact lens storage and disinfection cup system 10. The Thomas system is illustrated in FIG. 1 of the present application, and utilizes a planar central stem 12 that engages a cap 13. The stem 12 has dome features 14 on each side of the stem 12 and hinged containment cages 16 which pivot into a closed position over the domes 14 and parallel to the planar stem 12. Subsequent commercial cup disinfection and storage systems have generally followed the same layout with only minor differences in the ribbing of the cages or the form of the structure used to receive the contact lens. This layout of the lens retaining components has withstood the test of time in part due to the efficiency in which it utilizes space available within the cup. Typically, contact lens solution makers have settled upon the use of 10 cubic centimeters (cc's) of solution within the cup for purposes of disinfection or hydration. This volume of fluid may have been driven by the geometry of the cup design disclosed in the '113 patent in order to assure that lenses were fully immersed in solution; nevertheless the 10 cc fluid volume has become standard within the lens care industry and as a consequence, subsequent lens cup designs have been driven by the need to keep contained contact lenses fully immersed in 10 cc's of fluid.

Users of these lens cases generally find it easier to deliver their lenses to the dome feature 14 instead of the cage 16. This is in part due to the tendency of the damp lens to adhere the dome surface 14 which has more surface area than the cage 16 and more closely resembles the shape of a human eyeball. Since contact lens wearers typically grasp the lens by its convex outer surface to remove it from their eye, the dome 14 provides a ready receptacle without having to change one's grasp on the lens. Contact lens wearers also show preference for larger lens-receiving structures and cages as opposed to smaller ones in which fingers must be more dexterous in order to place or retrieve lenses. This user preference may also be driven by an older population of contact lens wearers who may lack the dexterity of younger lens users.

Although it would prove more convenient to the user to reverse the layout of the design disclosed in the '113 patent by providing the dome 14 on the more accessible hinged member 16, this has not been commercially pursued primarily due to the inefficient utilization of space and volume presented by such a layout. Direct reversal of the cup system layout disclosed in the '113 patent would require a larger diameter cup cylinder 18 to receive the basket and stem assembly which in turn would require use of more than the standard 10 cc's of lens care solution to assure immersion of the lenses.

Another method to facilitate such reversal would be to reduce the diameter and depth of the lens cage, but this would be judged as user unfriendly by a large portion of lens wearers who find smaller lens cages difficult to use. Typically, the inner base diameter of commercial contact lens cases range from 0.70 inches to 0.80 inches, and this is what users are accustomed to using.

The contact lens case configuration 10 disclosed in the '113 patent includes a latching mechanism 20 for holding the hinged members 16 closed in order to retain the lenses. As shown in FIG. 1, the latching mechanism 20 disclosed in the '113 patent consists of latch arms 22 which are disposed on the hinged members 16 and which are configured to engage bottom surfaces 24 of the central stem member 12. Many subsequent contact lens case systems have followed the same approach and have similar latching mechanisms. However, latches such as that which is disclosed in the '113 patent have a tendency to cut lenses that are not properly aligned when the hinged member is moved into the closed, latched position.

Most contact lens cases are made of plastic, using a molding process. The molding process used to produce plastic lens cases is generally paced by the speed at which heat can be removed from the molten plastic resin once it has been injected into the mold. Plastic resin must be sufficiently cooled and therefore hardened to prevent distortion upon ejection or handling. Overly thick sections of plastic slow down the molding process because they require more time to cool. In some instances, thick sections can warp or suffer from surface distortions known as sink, in which the molten plastic within the thick section pulls the hardened outside skin inwards as the molten resin shrinks during cooling. Makers of contact lens storage and disinfection cases based upon the lens case configuration disclosed in the Thomas '113 patent configuration have long suffered extended molding times and sink in parts as a result of the large plastic mass necessarily contained within the back-to-back dome configuration. The optimum dome shape and size cannot be efficiently produced with this layout. Precise configurations for the dome have proven impossible to mold on a reliable basis. Attempts to create a dome form from a series of contoured ribs or place apertures within the dome's center have generally resulted in domes that fail to present sufficient surface area to hold onto the lenses placed there or domes that will not release lenses for treatment once immersed in solution. These compromised domes may not preferentially retain lenses once the stem assembly has been withdrawn from its solution bath.

SUMMARY

An embodiment of the present invention provides an improved contact lens case which includes lens-receiving structures that are provided on hinged members. Preferably, the contact lens case is configured to efficiently utilize space and volume such that no more than 10 cc's of contact lens solution are required to disinfect contact lenses in the case. Additionally, preferably the contact lens case is configured such that it can be easily molded and assembled.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 7 is a perspective view showing the lens case closed with its cap on;

DETAILED DESCRIPTION OF ILLUSTRATED EMBODIMENTS

Figure 1:
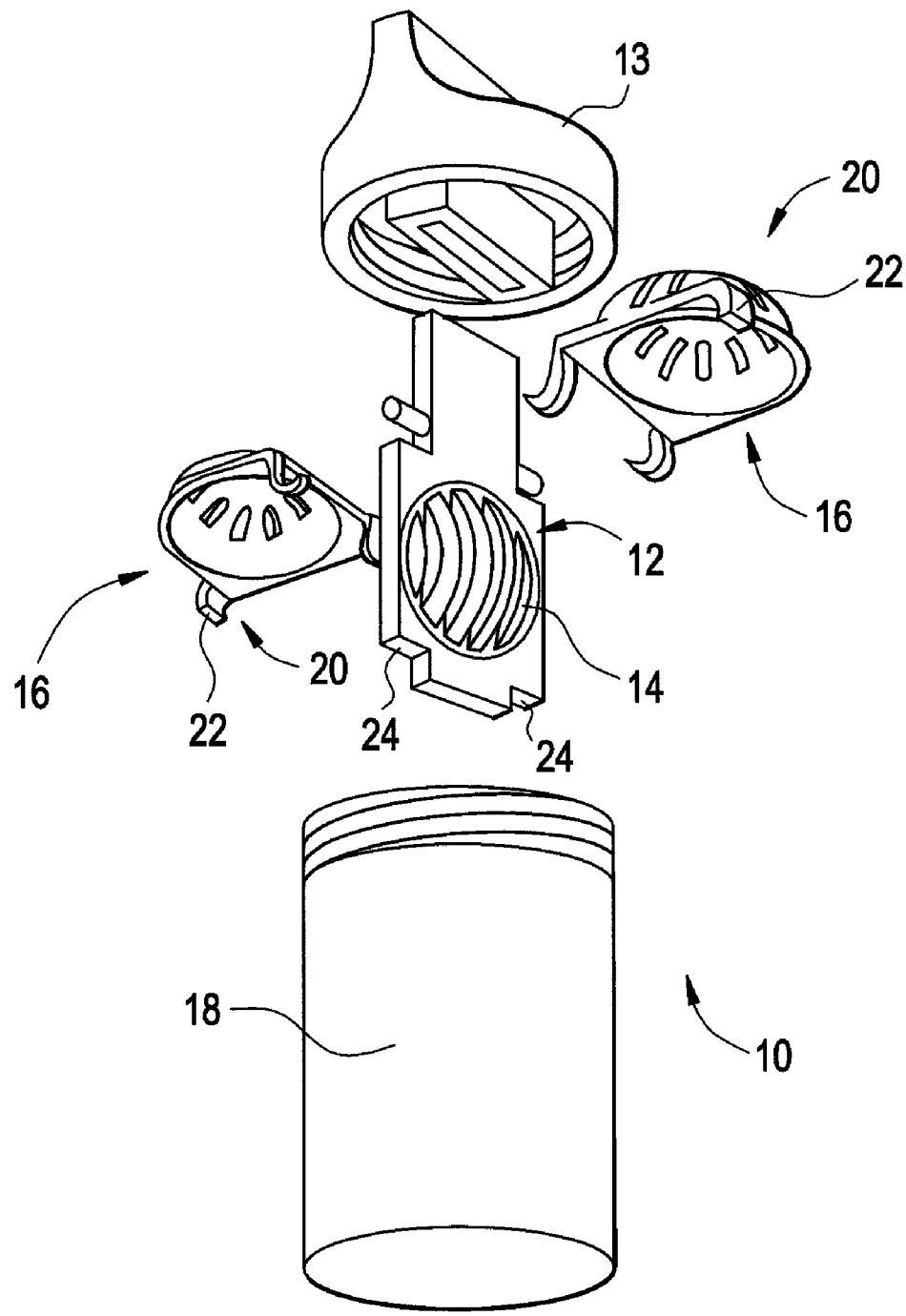
FIG. 1 is an exploded view of the prior art contact lens case configuration disclosed in U.S. Pat. No. 3,770,113 (Thomas)

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

Figure 6:
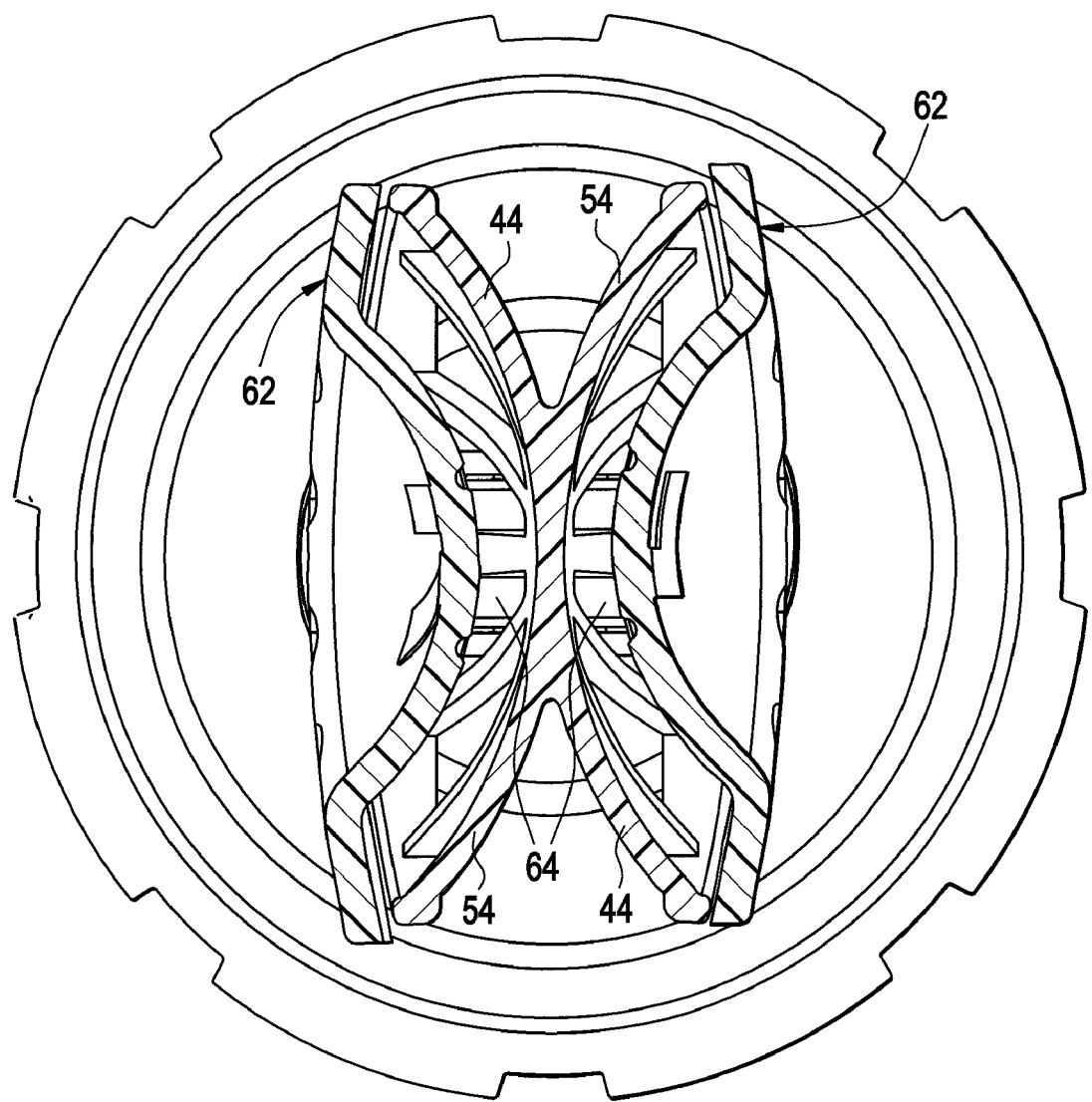
FIG. 6 is a cross-sectional view taken along line 6-6 of FIG. 5.
Figure 7:
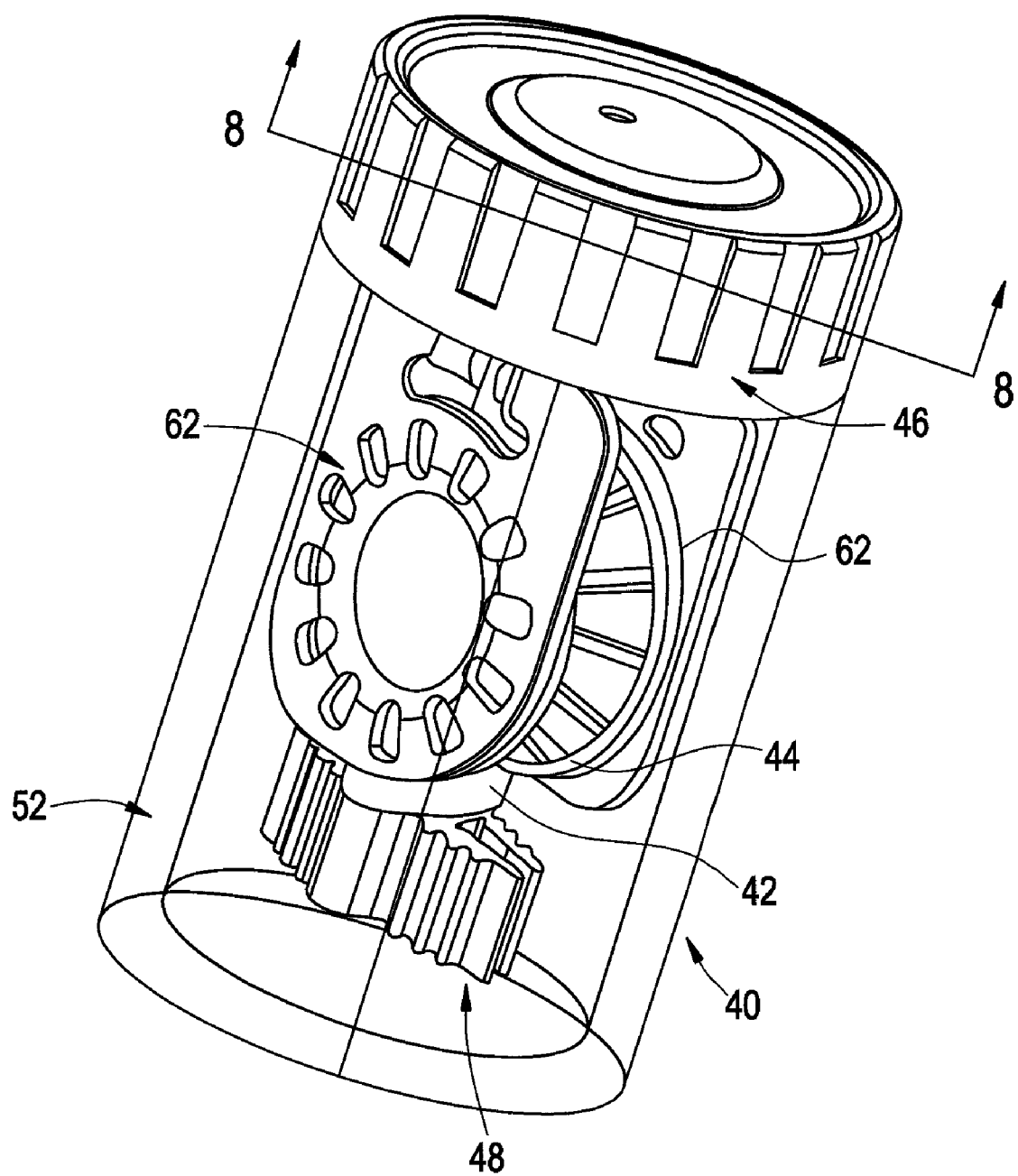

FIG. 7 illustrates a contact lens case 40 which is in accordance with an embodiment of the present invention. The contact lens case 40 includes a central stem 42 on which is disposed two back-to-back cages 44 (only one of the cages is visible in FIG. 7, but see also FIGS. 2, 4 and 6). The stem 42 is engaged with a cap 46, and a catalyst 48 is engaged with the stem 42 opposite the cap 46. The cap 46 engages the top 50 of a cylindrical cup 52, thereby forming an enclosed contact lens case.

Figure 2:
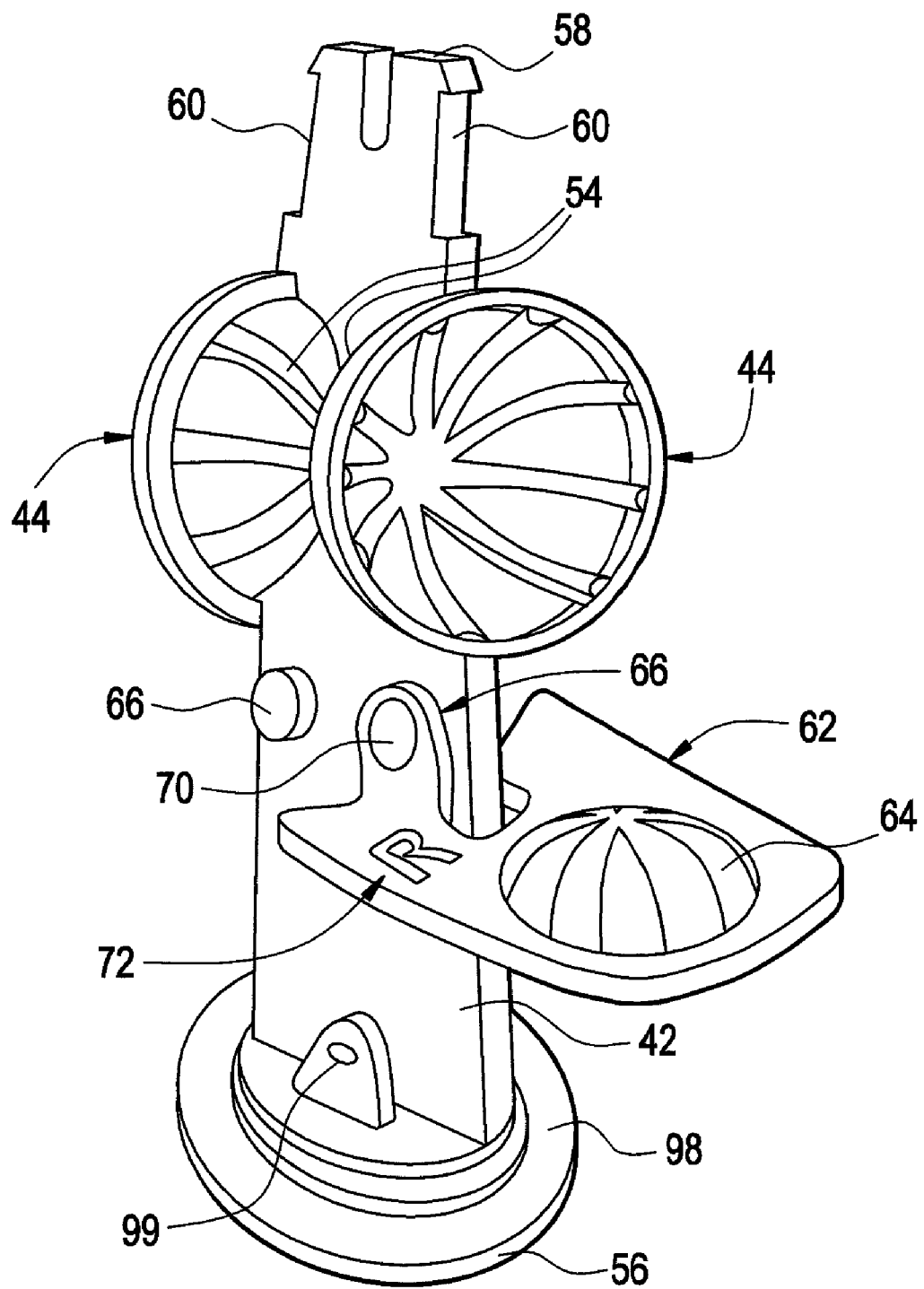
FIG. 2 is a top perspective view of certain components of a contact lens case configuration which is in accordance with an embodiment of the present invention, showing a stem, cages, and lens-receiving structures which are provided on hinged members.
Figure 3:
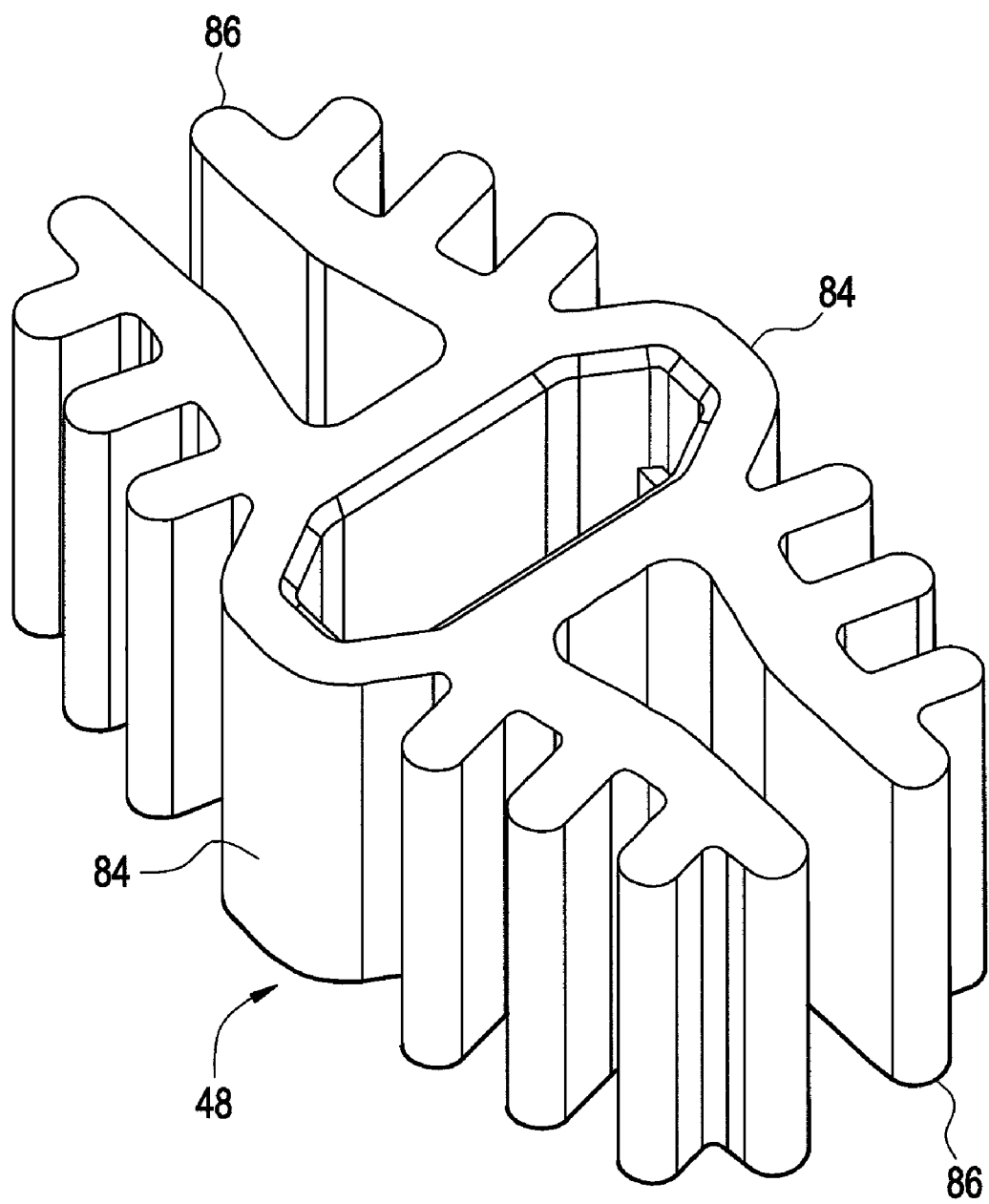
FIG. 3 is an enlarged perspective view of a catalyst which may be used in association with the contact lens case configuration shown in FIG. 2.
Figure 4:
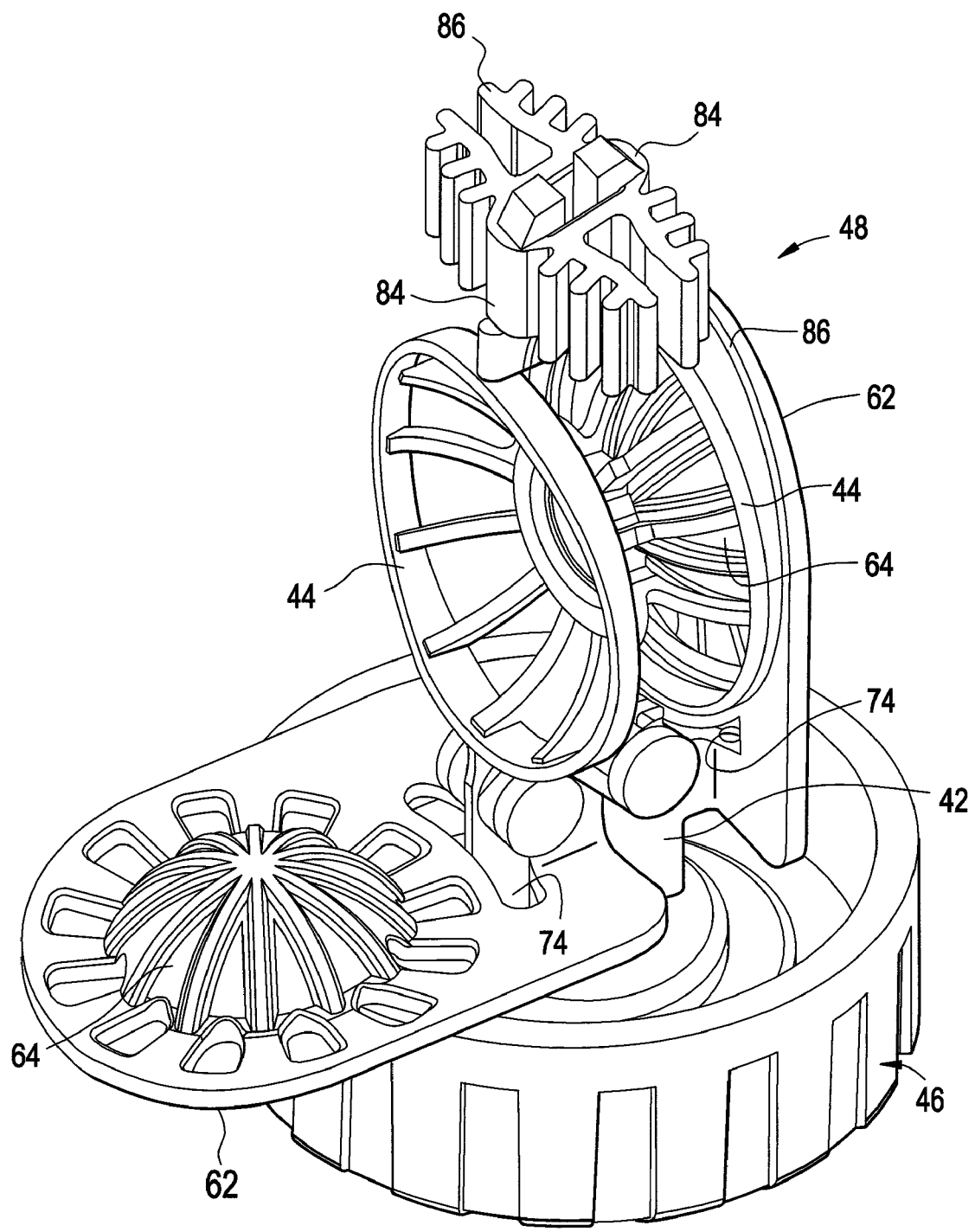
FIG. 4 is similar to FIG. 2, but shows the stem engaged with a cap, and the catalyst positioned on the end of the stem, showing one of the hinged members swung down.
Figure 5:
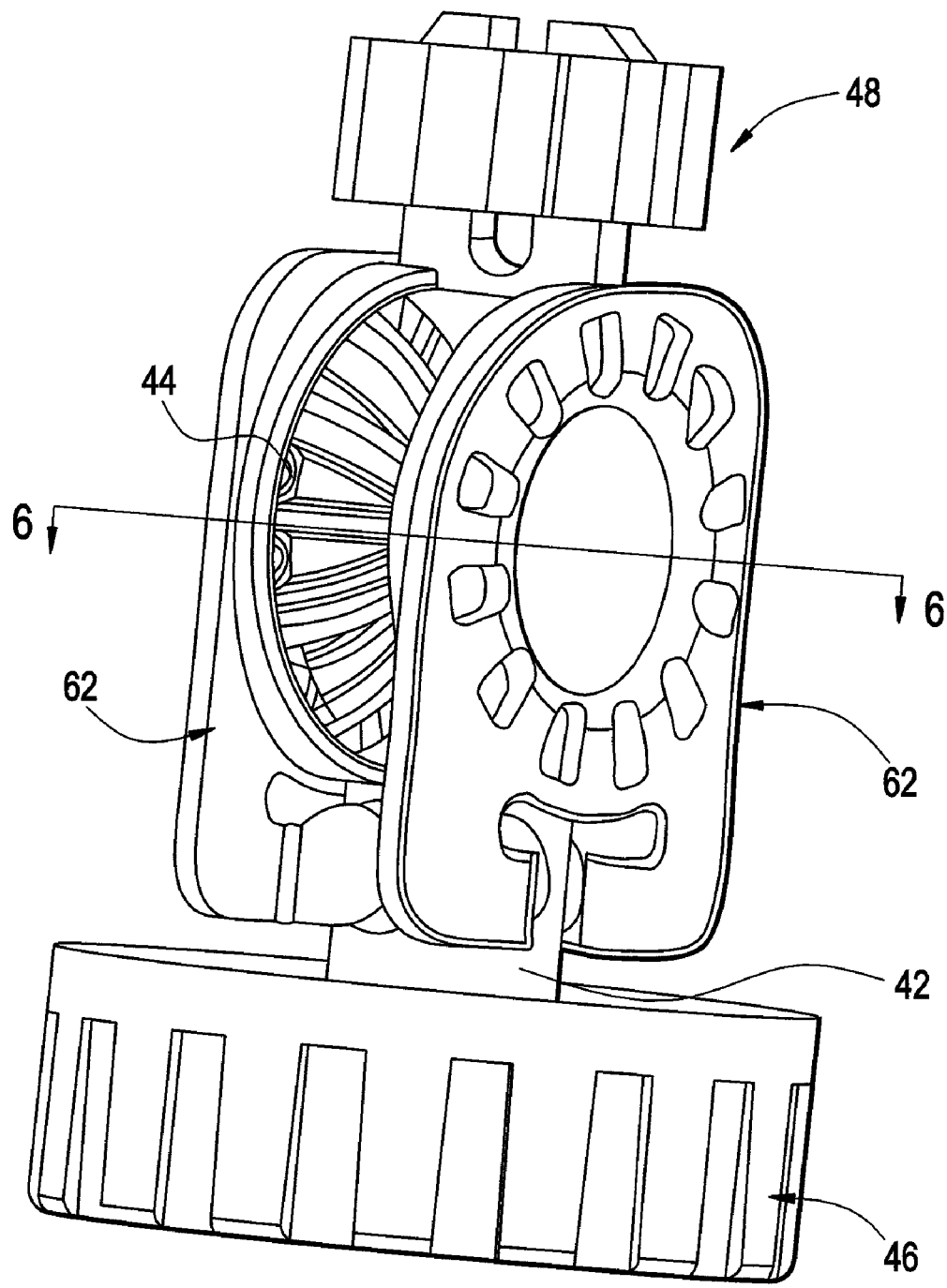
FIG. 5 is similar to FIG. 4, but shows both of the hinged members swung up and latched in place relative to the stem.

FIG. 2 shows the stem 42 disengaged from the cap 46. As shown, the stem 42 is planar and has two, back-to-back cages 44 disposed thereon. The cages 44 may be engaged with the stem 42 in a snap-fit arrangement. Alternatively, the cages 44 may be integral with the stem 42 (for example, the stem 42 and cages 44 may be a single, plastic molded piece). Regardless, preferably the cages 44 are positioned in back-to-back orientation, with their convex sides 54 facing each other. Preferably, one end 56 of the stem 42 is configured for engagement with the inside of the cap 46, while the opposite, distal end 58 of the stem 42 is configured to receive a catalyst 48. To that end, indentations 60 may be provided on the stem 42, near its distal end 58, for receiving and retaining a catalyst 48. FIG. 3 illustrates one possible shape of the catalyst 48 which can be used, and FIGS. 4, 5 and 7 illustrate the catalyst 48 engaged with the stem 42. The catalyst will be described in more detail later hereinbelow.

As shown in FIGS. 4, 5 and 7, hinged members 62 are engaged with the stem 42 and each of the hinged members 62 includes a lens-receiving structure 64 such as a solid dome-shaped portion for retaining contact lenses thereon. The hinged members 62 are preferably non-planar (see FIG. 6 which provides a cross-sectional view taken along line 6-6 of FIG. 5) which allows the lens-receiving structures 64 to be provided on the hinged members 62 rather than having to be on the stem 42, and allows the use of deep larger diameter, back-to-back cages 44 on the stem 42, without having to resort to using more than 10 cc's of fluid to immerse contact lenses that are disposed on the lens-receiving structures 64, between each of the lens-receiving structures 64 and a respective cage 44. Each of the hinged members 62 is cylindrically-curved, having a cylindrically-curved shell form in which the axis of its curve is approximately parallel to the central axis of the central planar stem member 42. Specifically, the central axis of each lens cage is disposed parallel to the geometric plane described by the stem 42. Additionally, the central axis of pivoting for each hinged member 62 is perpendicular to the geometric plane described by the stem 42.

Figure 8:
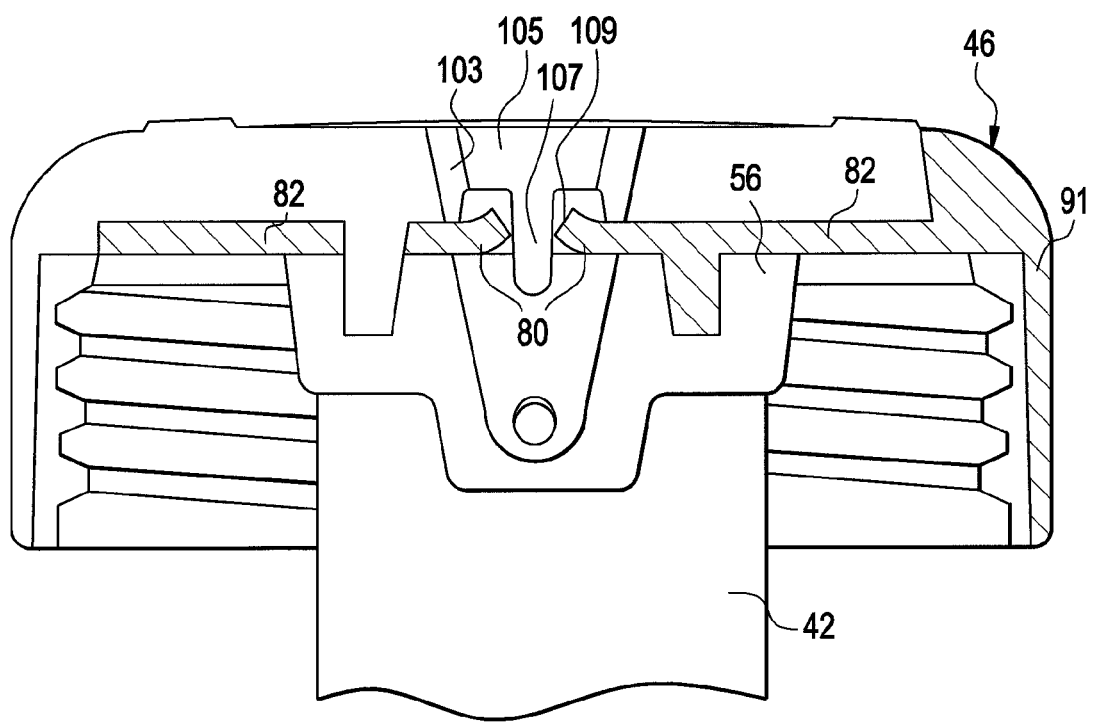
FIG. 8 is a cross-sectional view taken along line 8-8 of FIG. 7.
Figure 17:
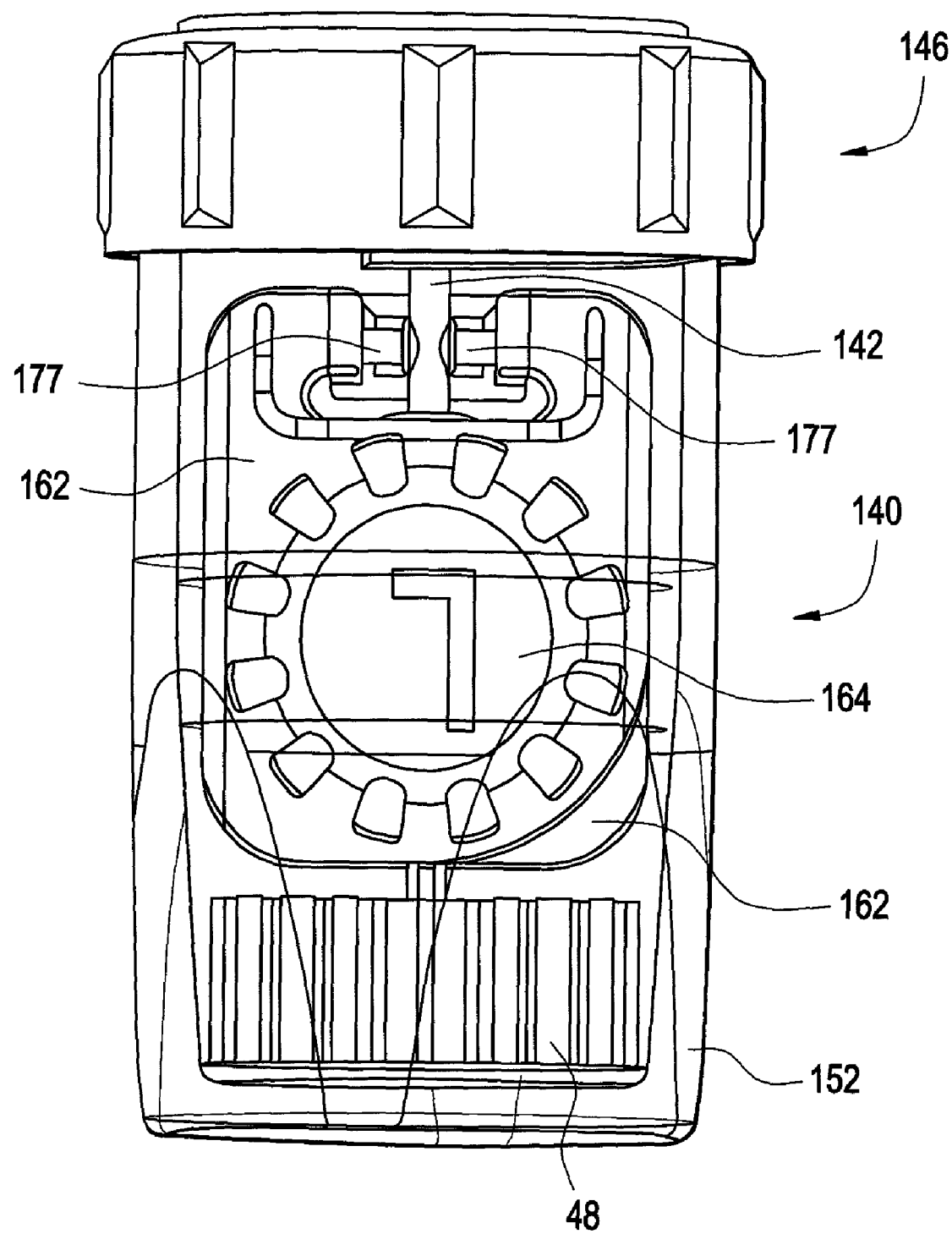
Figure 18:
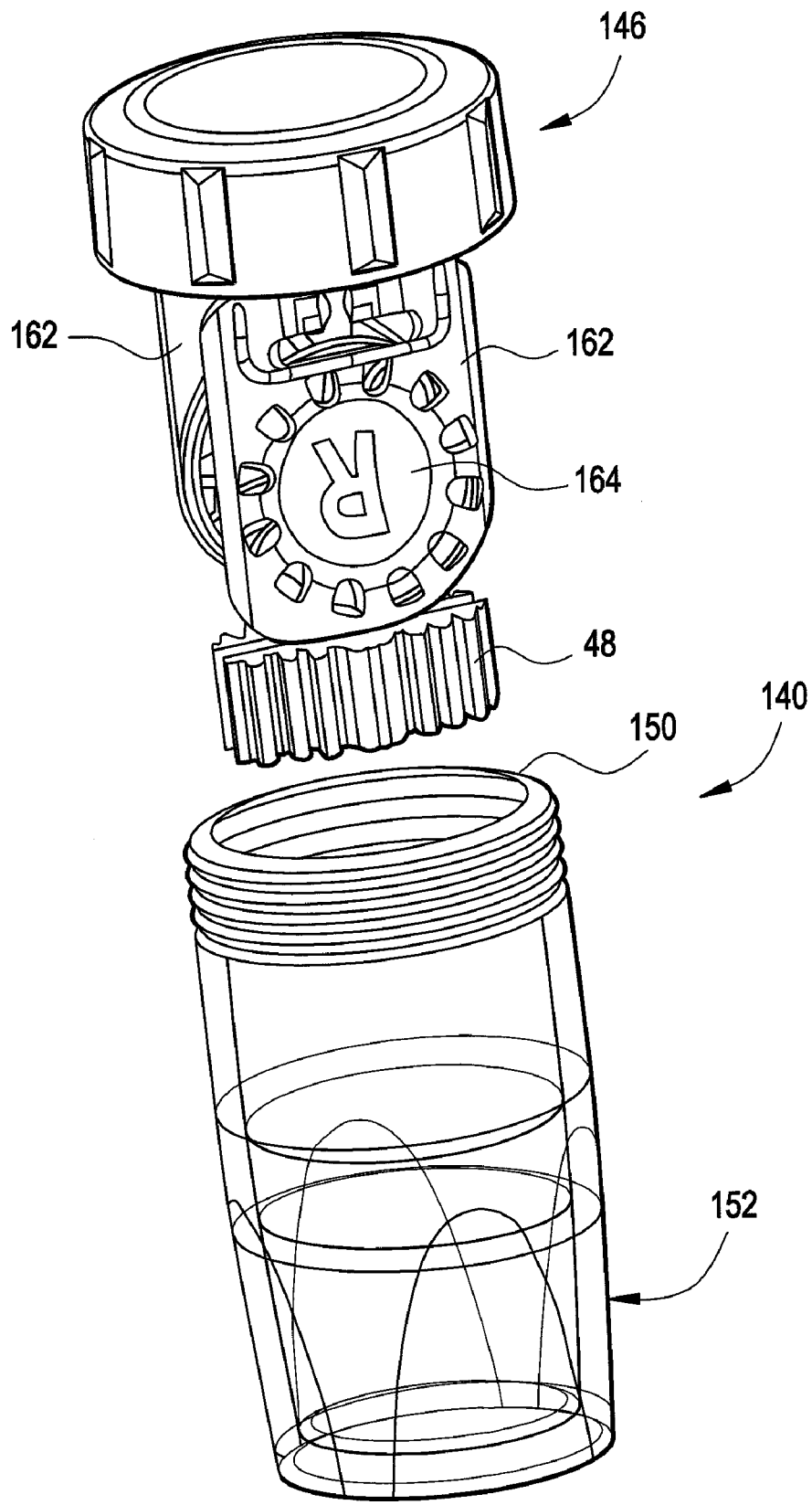
FIG. 18 is a view of the contact lens case shown in FIGS. 15-17, depicting the contact lens case opened, with its cap disengaged from its cup.

Each hinged member 62 is configured to mount and pivot upon fixed hinge pin receptacles 66 formed upon a common center opposite one another on each side of the planar stem 42. Small inward facing pin structures 70 are provided on the hinged members 62 to serve as hinge pins which mount and pivot within the hinge pin receptacles 66 formed on the planar stem 42. As such, when a hinged member 62 is pivoted open as shown in FIGS. 2 and 4, the lens-receiving structure 64 of the hinged member 62 becomes exposed, ready to receive a contact lens. As shown in FIGS. 4 and 8, preferably the cap 46 is generally shaped flat on its top in order to sit stable, inverted on a table surface while lenses are being delivered for disinfection or removed after disinfection. Once a contact lens is positioned on the lens-receiving structure 64, the hinged member 62 can be pivoted closed, such that its lens-receiving structure 64 and the respective cage 44 on the stem 42 effectively mate, retaining a contact lens therebetween. FIG. 4 shows the stem 42 engaged with the cap 46, a catalyst 48 on the end 58 of the stem 42, and one of the hinged members 62 pivoted down, thereby exposing the lens-receiving structure 64 on the hinged member 62 (and a contact lens, if a contact lens were on the lens-receiving structure 64). FIG. 5 shows both hinged members 62 pivoted closed, and FIG. 7 shows both hinged members 62 pivoted closed, and the cap 46 engaged with a cylindrical cup 52. As shown in FIG. 2, each of the hinged members 62 preferably has a right/left indicator 72 (FIG. 2 only shows the hinged member 62 meant to be associated with the contact lens for the right eye), so that a user knows which contact lens is supposed to be engaged with that particular lens-receiving structure. Similarly, while FIG. 17 shows one of the hinged members 62 including the indicia "L", thereby indicating to the user that that particular hinged member 62 is meant for use with the contact which is placed in the left eye, it should be understood that preferably the other hinged member 62 includes the indicia "R", thereby indicating to the user that that particular hinged member 62 is meant for use with the contact which is placed in the right eye.

As shown in FIG. 4, for example, the fixed hinge elements 62 on the planar stem 42 are cylindrical in nature, each with slot interruptions 74 located 180 degrees from one another in a plane parallel to the center line of the planar stem 42 to allow flushing and drainage and avoid trapping fluid while in an upright or inverted position. Additionally, as shown in FIG. 2, preferably an internal vent port 99 is provided at the base 98 of the stem 42.

Figure 9:
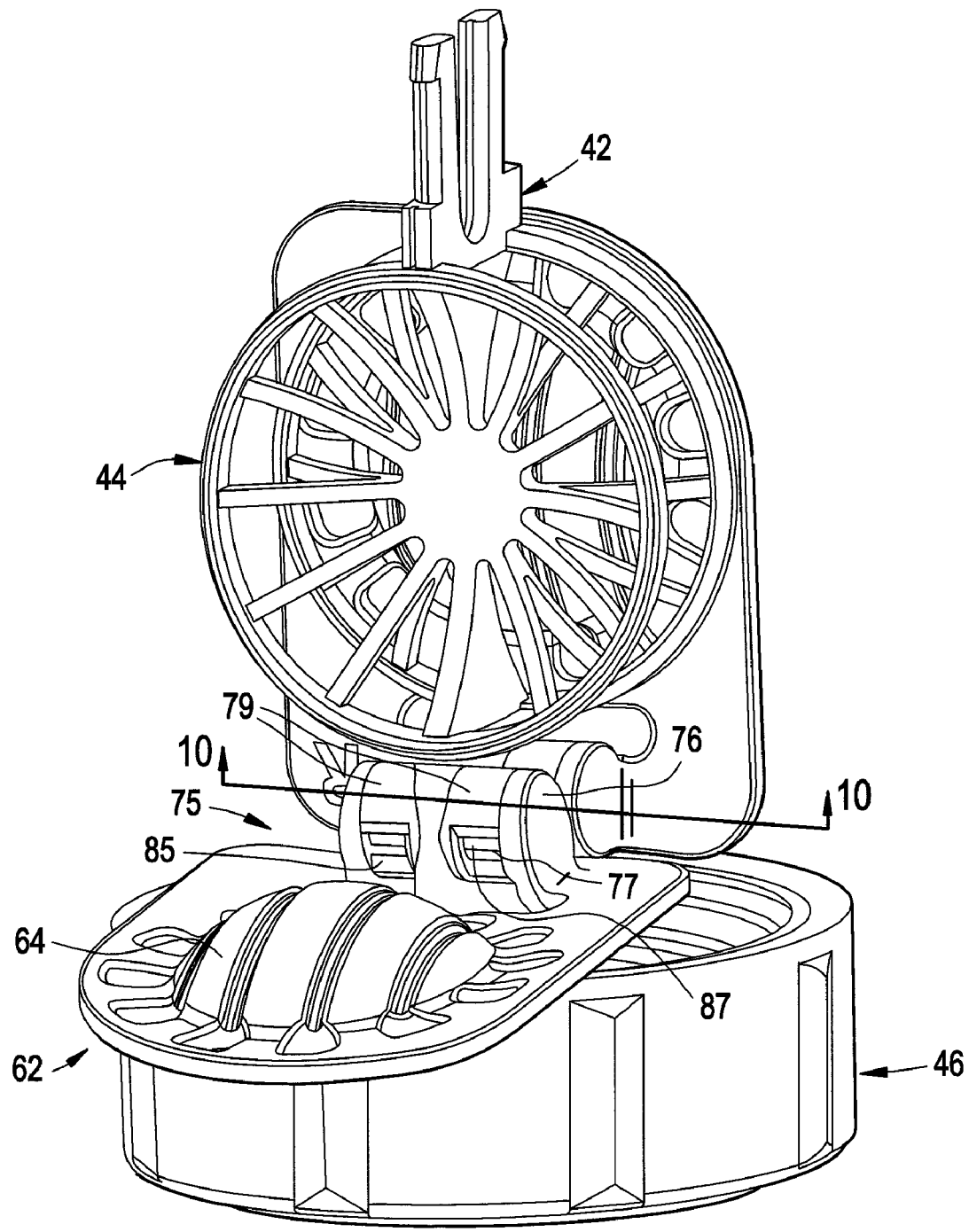
FIG. 9 is a perspective view of the lens case, showing one of the hinged members in the open position.
Figure 10:
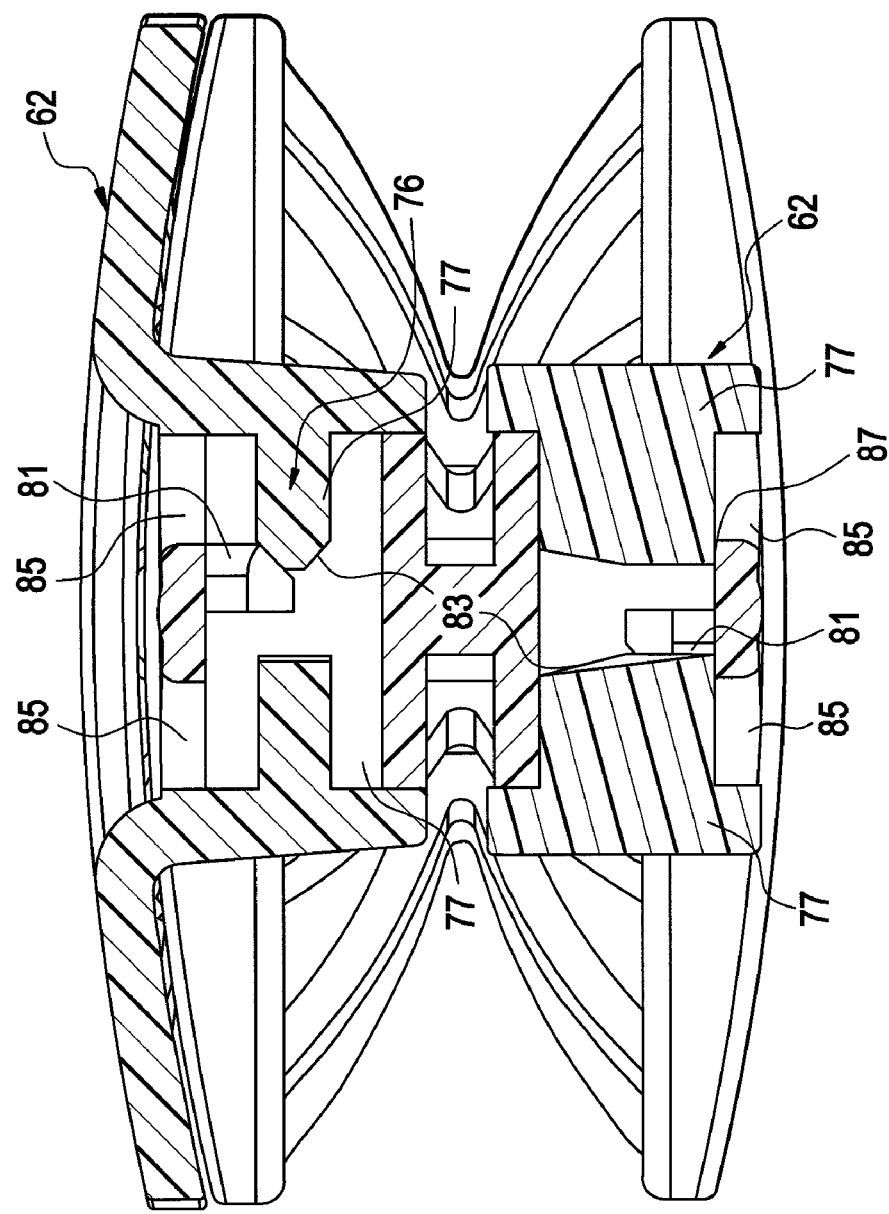
FIG. 10 is a cross sectional view, taken along line 10-10 of FIG. 9, showing a close up of the latch mechanism within the lens case in both open and closed positions.
Figure 13:
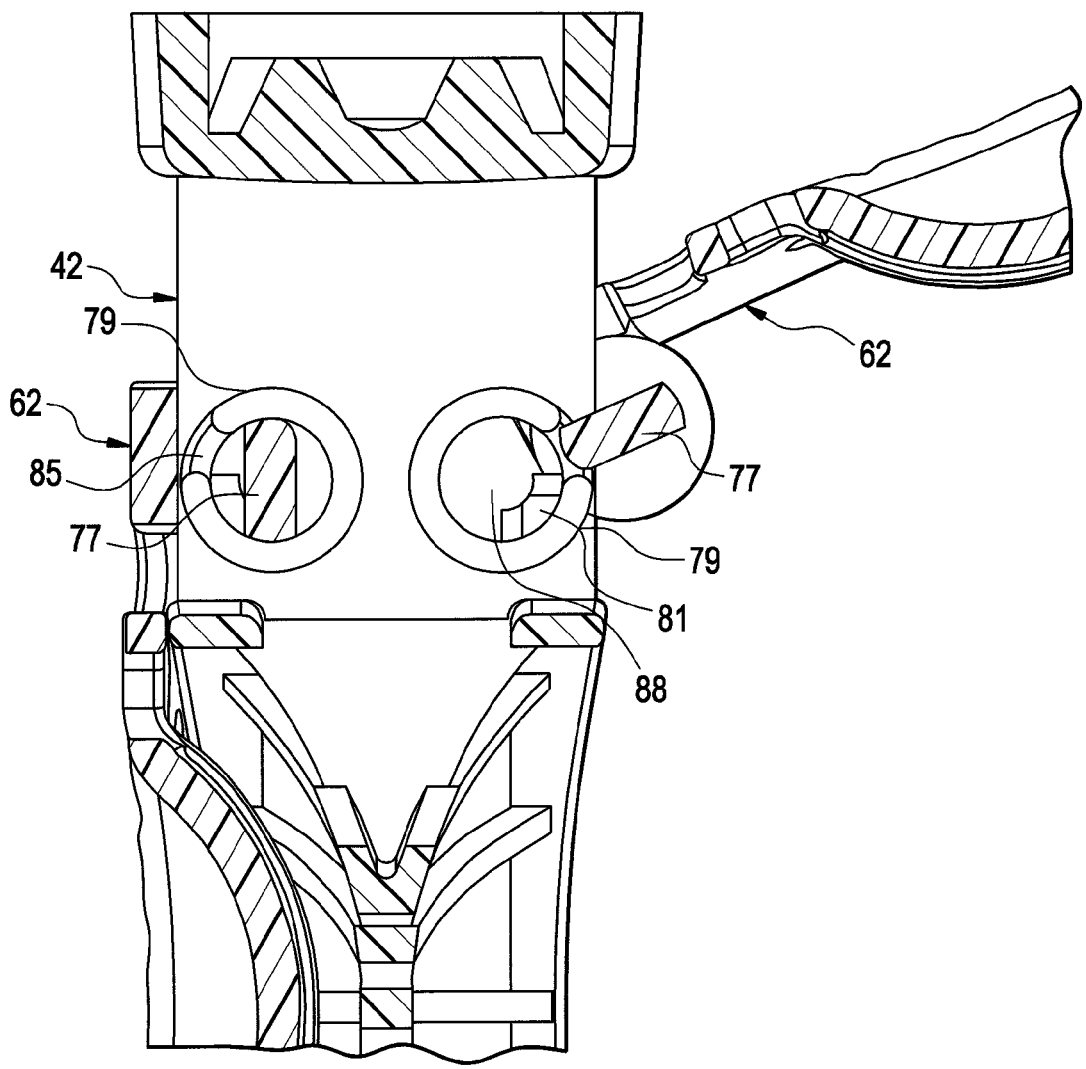
FIG. 13 is a view of the cylindrical hinge receptacle of a stem receiving the planar hinge pin of a cross sectioned hinged member into its slot.
Figure 14:
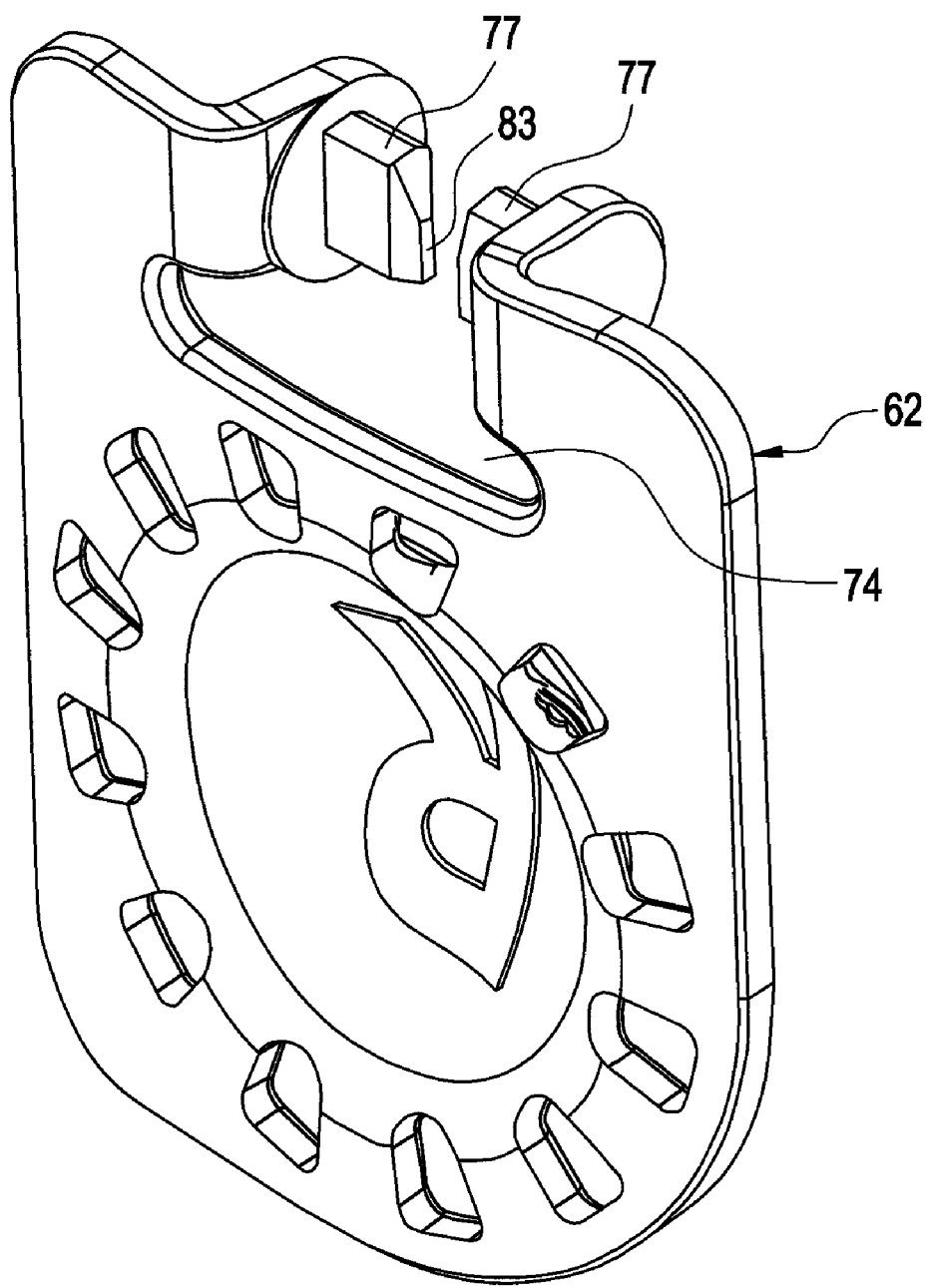
FIG. 14 is a perspective view of a hinged member showing its opposing planar hinge pins and slot interruption.
Figure 15:
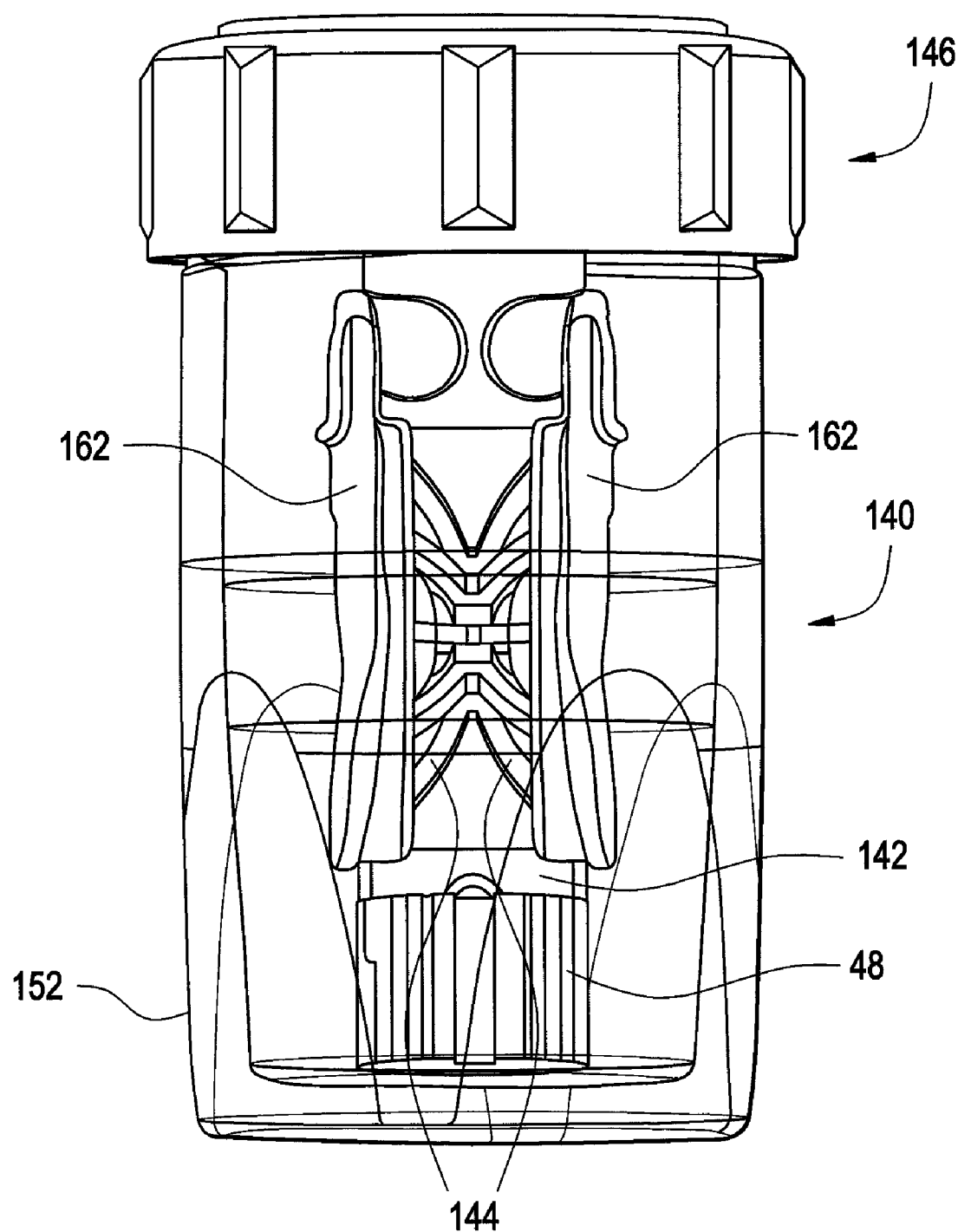
FIGS. 15-17 are side views of a contact lens case which is in accordance with a preferred embodiment of the present invention.

As shown in FIG. 14, a second potential hinging mechanism 75 for hinging employs inwardly opposed planar hinge pins 77 upon element 62 that are inserted as shown in FIG. 13, into cylindrical receptacles 79 provided upon stem 42. As shown in FIG. 9, cylindrical receptacles 79 are positioned perpendicular to the plane of stem 42 and share a common axis with one another on opposite sides of stem 42. Receptacles 79 each have aligned receiving slots 85 positioned to allow insertion of opposed hinge pins 77 into an inner cylindrical bore 88. FIG. 13 shows how the planar hinge pins 77 of element 62 are inserted into the receiving slots 85. Assembly of the hinged member 62 utilizes a snap together method with retention of the planar hinge pins 77 being assured by means of the hinge pin retention ledge 87 shown in FIG. 10. Retention ledges 87 result from a gap between tapered ends of opposed hinge pins 77 that is smaller than the width between the bottoms of adjacent receiving slots 85. Slots 85 in hinge receptacles 79 provide for drainage of fluid from within each hinge receptacle structure while the small surface area of planar hinge pins 77 remaining in contact with the cylindrical interior of hinge receptacles 79 serve to both facilitate this drainage and minimize fluid retention within the hinge assembly due to capillary attraction.

Figure 11:
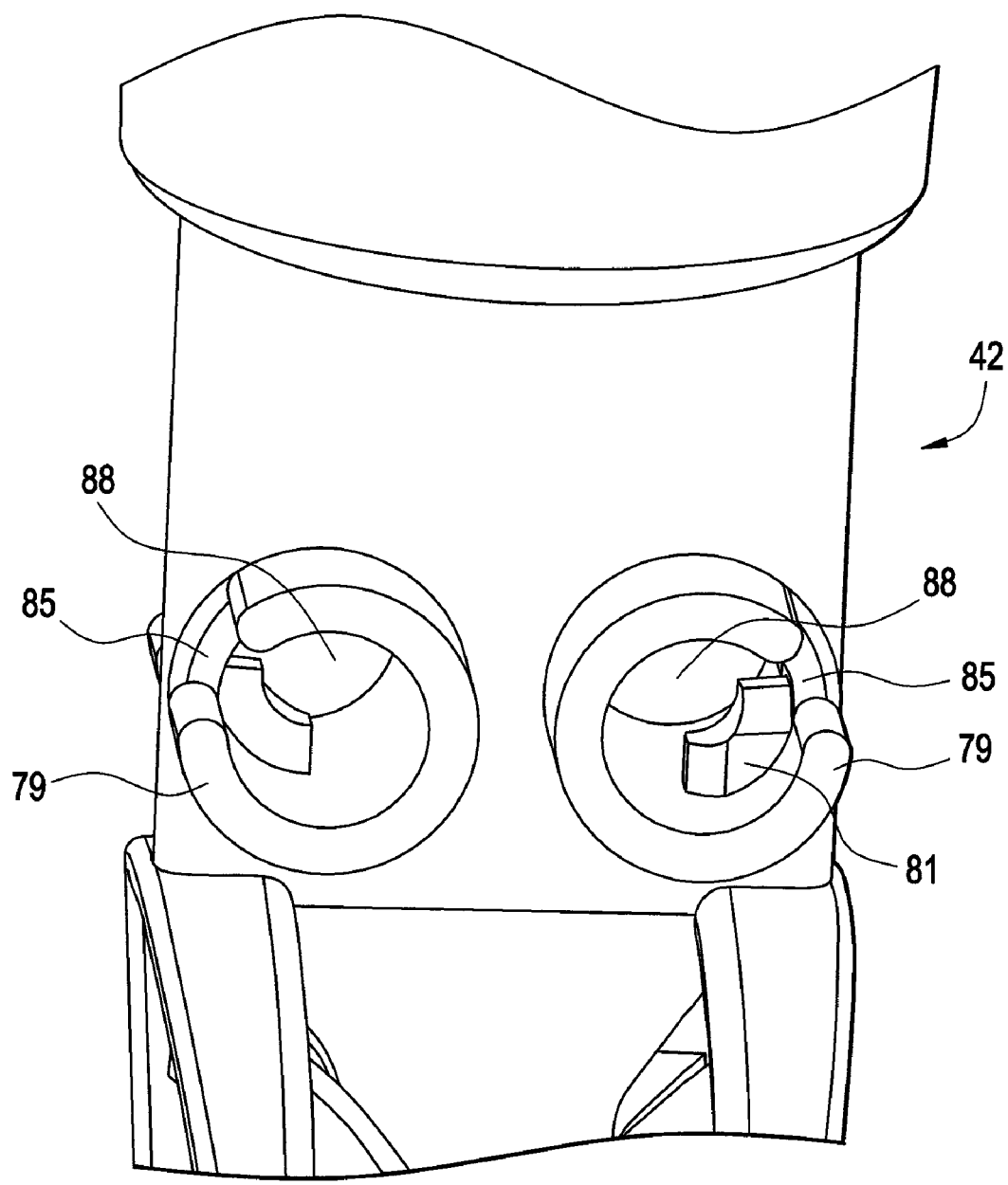
FIG. 11 is a perspective view of the stem showing the cylindrical hinge receptacles and an internal detent cam surface.

As discussed in the background section, latching mechanisms commonly used to hold the hinged members closed in order to retain lenses have often followed the example demonstrated by the Thomas '113 patent. These latches however, have a reputation for cutting misplaced lenses and so it is desirable to utilize a remote latching mechanism. One example of such a mechanism is disclosed in U.S. Pat. No. 4,807,750. The lens case 40 disclosed herein also utilizes a latch mechanism 76 to hold each hinged member 62 closed and prevent lens damage. As shown in cross section in FIG. 10, the latch mechanism 76 may comprise a feature located within each pair of cylindrical hinge receptacles 79 which supports a detent cam surface 81 shown in FIG. 11, positioned to engage at least one planar hinge pin 77 of each hinged member 62 and thereby hold the hinged member 62 in a closed position. Preferably, the same detent cam 81 is provided for each hinged member 62.

As shown in FIG. 9, the latch mechanism 76 also functions to hold the hinged members 62 open. Specifically, as a hinged member 62 is pivoted open, the planar hinge pin tip 83 rides across detent cam surface 81 and seats on the other side of detent cam surface 81. The detent cam surface 81 and tip 83 of planar hinge pin 77 are configured such that in either position—whether the hinged member 62 is in the open or closed position—the hinged member 62 tends to stay in that position unless intentionally pivoted by a user. Movement of both hinged members 62 from an open or closed position to the opposite position causes tip 83 to ride over cam surface 81 urging the attached planar hinge pin 77 outward over cam surface 81 forcing it away from its opposing hinge pin. Once tip 83 arrives on the other side of cam surface 81 in the new open or closed position, tip 83 springs back to its original location and distance from its opposing planar hinge pin. This spring action which allows tip 83 to traverse over cam surface 81 and return to its original position on hinged member 62 results from elastic deformation of hinged member 62. Slot interruptions 74 (see FIG. 14, for example) assist in keeping deformation stresses resulting from traversing cam surface 81 within the elastic deformation limits of hinged member 62 and below the point of permanent plastic deformation. This detenting feature is desirable in order to facilitate delivery of lenses to the lens-receiving structures 64 and to prevent movement of the hinged lens-receiving structure 64 during retrieval of a disinfected lens.

Preferably, the abutting mating faces of each cage 44 and its respective hinged member 62 are preferably curved to match one another (see FIG. 6). An assembly of the planar central stem 42 with back-to-back lens cages 44 and mating curved hinged members 62 on either side results in a package that does not require as large a cup diameter to accommodate the internal components as would be required if the cages and lens-receiving structures were instead to be provided as having flat faces. Preferably, the case is configured such that use of curved, lens-receiving structure-carrying hinged members 62 allows a desirable lens cage inner base diameter of 0.75 inches to be employed without losing full lens immersion with 10 cc's of lens solution.

Making the lens-receiving structure 64 an integral, thin-walled and continuous element of the hinged member 62 allows a precise lens-receiving structure form to be quickly molded in a repeatable reliable manner without distortion or sink. Lens-receiving structures formed in this manner can be designed to optimize features necessary for preferential retention of lenses during placement and after disinfection or storage.

Contact lens cases following the contact lens case configuration disclosed in the Thomas '113 patent have long been used with Hydrogen Peroxide lens disinfection solutions. These solutions must be broken down by metal or organic catalyst means into water and Oxygen in order to neutralize the strong oxidizing agent prior to insertion of treated lenses within the eye. Regardless of the mechanism used to neutralize the Hydrogen Peroxide, evolved Oxygen gas must be vented off to avoid building excessive pressure within the lens case. Pressures exceeding 100 psi are possible within the small volume of a cup type lens case. The mechanism to relieve this pressure must flow only one way in order to prevent intrusion of contaminants or organisms from outside the lens case. Means to provide one way pressure relief are disclosed in U.S. Pat. Nos. 4,956,156 and 5,250,266, and these two patents are hereby incorporated herein by reference in their entirety. These venting systems require an elastomeric membrane having either a precise hole or slit through which excess pressure can be vented in a controlled manner. It is also desirable to have a seal at the cap to cup interface in order to contain fluids within the system and exclude contaminants or organisms.

As shown in FIG. 8, the contact lens case 40 disclosed herein utilizes a pressure venting mechanism, such as a vent membrane 80, to relieve excess pressure through a vent notch 103 in the cap 46, as well as a sealing means, such as a sealing gasket 82 portion of the vent membrane 80, at the cap-to-cup interface. As shown in FIG. 8, the cap 46 includes a plug 105 having a post 107 for sealing of the vent notch 103. Specifically, the membrane 80 provides a vent hole 109 in which the post 107 becomes disposed when the cap 46 is screwed on to the top 50 of the cup 52. When venting takes place, the membrane 80 moves away from the post 107 creating a gap, and venting then becomes possible through the vent notch 103 in the cap 46.

Figure 12:
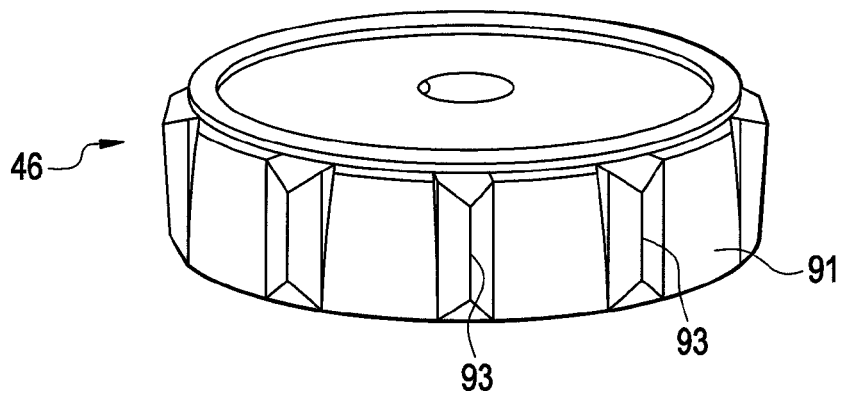
FIG. 12 is a top perspective view of a cap of the lens case, shown alone for clarity.

As shown in FIG. 8, the vent membrane 80 and sealing gasket 82 need not be separate pieces. They can be created simultaneously during the cap's molding process in which, as shown in FIG. 12, a thermoplastic elastomer 91 is overmolded on the plastic cap structure 46 such that the thermoplastic elastomer 91 becomes effectively integral with the gasket 82 and vent valve 80. As such, an integrally molded cap gasket and elastomeric exterior cap surface are provided, as well as an integrally molded vent mechanism and elastomeric exterior cap surface. Preferably, the thermoplastic elastomer 91 covers the exterior surface of the cap 46 and provides corners 93 to enhance wet grip and tactile feel. Such an approach (i.e., molding the thermoplastic elastomer 91 such that the thermoplastic elastomer becomes effectively integral with the gasket 82 and vent valve 80) eliminates a need to procure or assemble these two separate components to the cap 46. Part count is reduced by this means and the assembly process is simplified through elimination of two handling and assembly stations for both parts. Additionally, when using a separate relief valve as described in U.S. Pat. Nos. 4,956,156 and 5,250,266, it is necessary to assemble the planar stem component to the cap in a very rigid manner such as by welding in order to assure sufficient sealing of the valve's perimeter to the opposing cap and stem surfaces. When using a separate gasket it may also be necessary to retain the gasket by providing a flange feature on the stem's mount. When the valve and gasket are overmolded in place, as shown in FIG. 8, retaining and sealing features are no longer required to be provided between cap and stem mount, and simpler less rigid means to retain the stem to the cap can be utilized. A welding station for instance, could also be eliminated from the assembly process.

Contemplated herein also is a redesign of a reaction catalyst that may be attached to the distal end 58 of the planar stem 42. Companies such as Bausch and Lomb (easySEPT®), CIBA Vision Corporation (AOSept®) and Sauflon Pharmaceuticals Inc. (OneStep®) each offer Hydrogen Peroxide lens disinfection cup systems having Platinum based catalyst to break down the disinfectant. AMO (Oxysept®) (a division of Abbott Laboratories) and CIBA Vision (Blue Sept®) offer Hydrogen Peroxide systems which utilize tablets of catalase enzyme to break down the disinfectant. Those systems having the metal-based catalyst all use similar disk like catalytic elements generally cylindrical in form with vertical ribbing and having less height than the diameter of the circle they would fit into. From a user standpoint, these cylindrical forms if attached to the distal end of the stem tend to obstruct users delivering and retrieving their lenses. The catalyst redesign proposed here, and illustrated in FIG. 3, provides a catalyst 48 which is somewhat elliptical rather than round in form with the short side 84 of the elliptical form aligned with the hinged members 62 (see FIG. 4), and the long side 86 of the elliptical form being perpendicular to the hinged members 62. This orientation helps assure that the catalyst 48 does not inhibit user access to the lens-receiving structures 64. Height of this reconfigured catalyst would not be appreciably different from existing catalysts in the market place, the amount of active surface area and its orientation being the most important factors in determining final catalyst design.

Significant features of the contact lens case 40 disclosed hereinabove may include, but may not be limited to:

1. Cylindrically curved mating surfaces on the lens cage and pivoting structures which are configured to receive the lenses.
2. Large lens cage inner base diameter of 0.75 inches resulting from use of cylindrically curved mating surfaces of lens cage and lens-receiving structure.
3. Larger properly shaped lens-receiving structures to better match lenses.
4. Snap together assembly of hinged lens-receiving structure to planar stem.
5. Remote latch to hold hinged member closed.
6. Remote latch to hold hinged member both open and closed.
7. Pressure venting mechanism.
8. Integrally molded vent mechanism.
9. Integrally molded vent mechanism and cap gasket.
10. Integrally molded vent mechanism, cap gasket and elastomeric exterior cap surface.
11. Redesigned catalyst to improve user access to lenses.

12. The cap has a flat top which allows it to sit upright for improved user access (compare to the cap design of the Thomas '113 patent (see FIG. 1 of the present application) and AO Sept® type cup).

13. Drain features in hinge structure.

FIGS. 15-18 illustrate a contact lens case 140 which is in accordance with a preferred embodiment of the present invention. The contact lens case 140 is very similar to the contact lens case 40 previously described, and so only the differences will be discussed in detail. Like the contact lens case 40 previously described, the contact lens case 140 includes a stem 142 that has back-to-back cages 144 thereon, hinged members 162 that have lens-receiving structures 164 thereon, and a cup 152. The contact lens case 140 also includes a cap 146 which is part of a cap assembly (described in more detail later hereinbelow), and which engages the top 150 of the cylindrical cup 152, such as in a threaded engagement, thereby providing that the lens case 140 is an enclosed structure. A catalyst is engaged with the stem 142 opposite the cap 146, and the catalyst may be a conventional catalyst or a catalyst 48 such as is shown in FIG. 3 and which has been described hereinabove.

Figure 23:
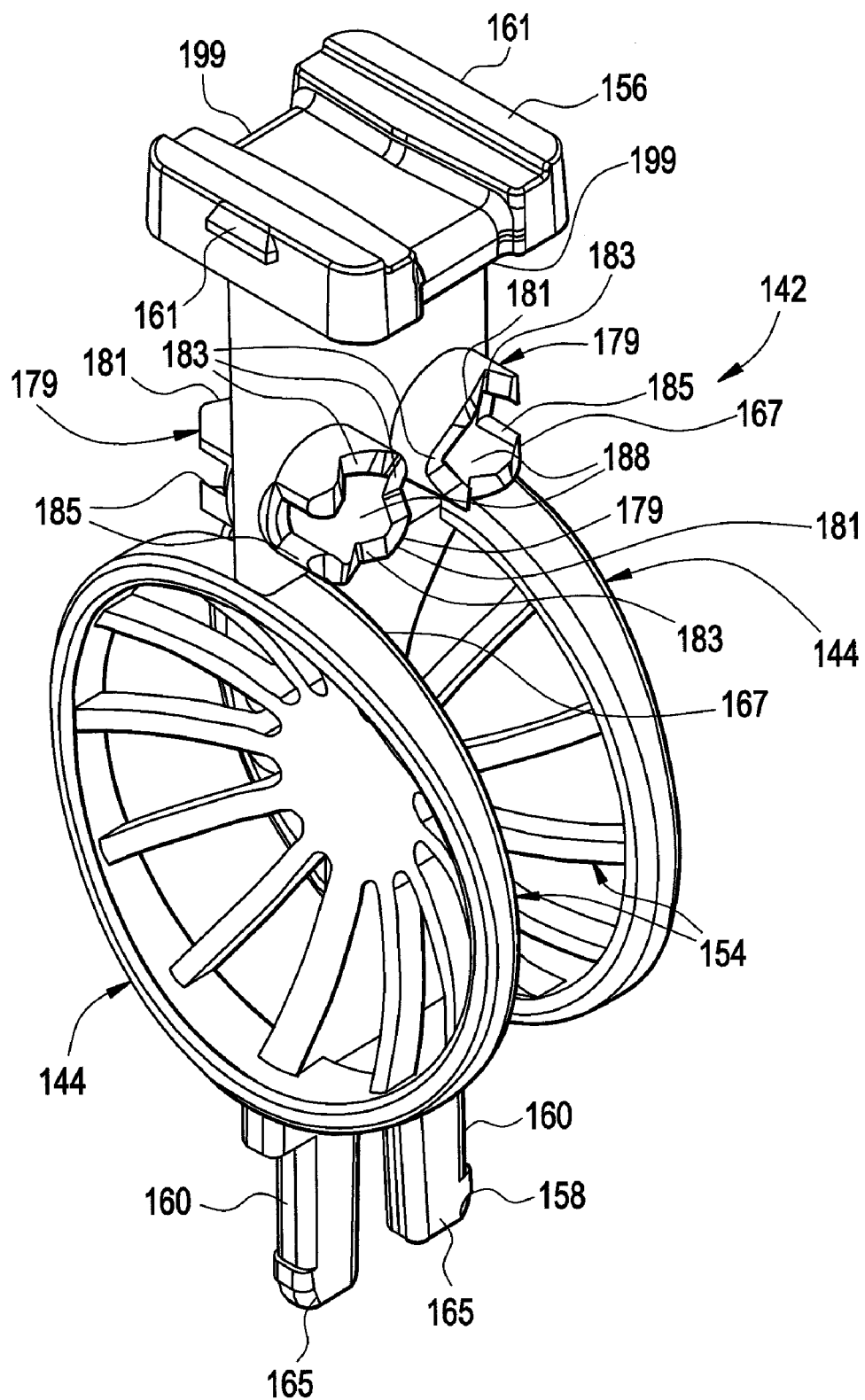
FIG. 23 is a perspective view of a stem component of the contact lens case shown in FIGS. 15-18.
Figure 24:
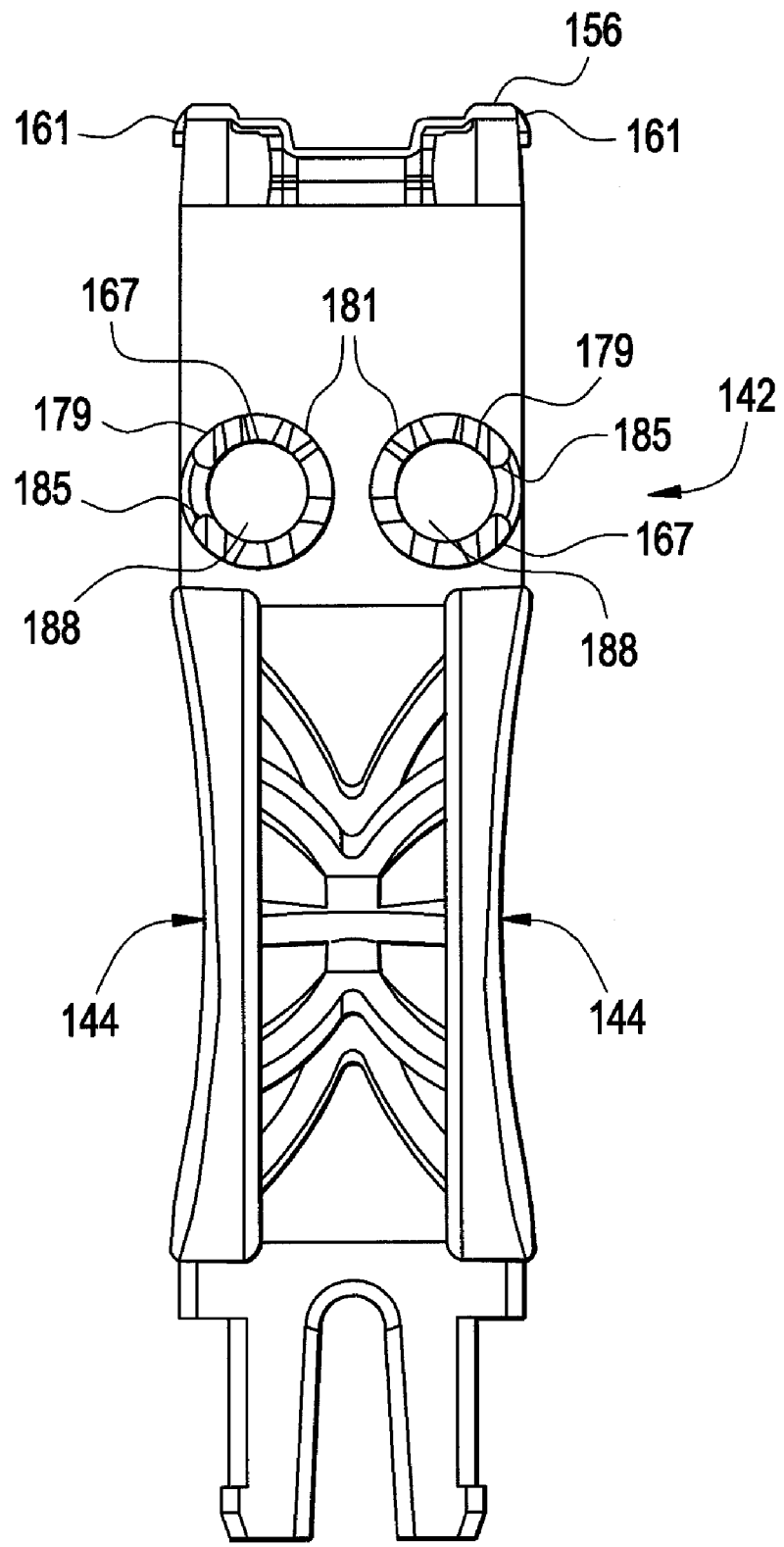
FIG. 24 is a side view of the stem component shown in FIG. 23.
Figure 25:
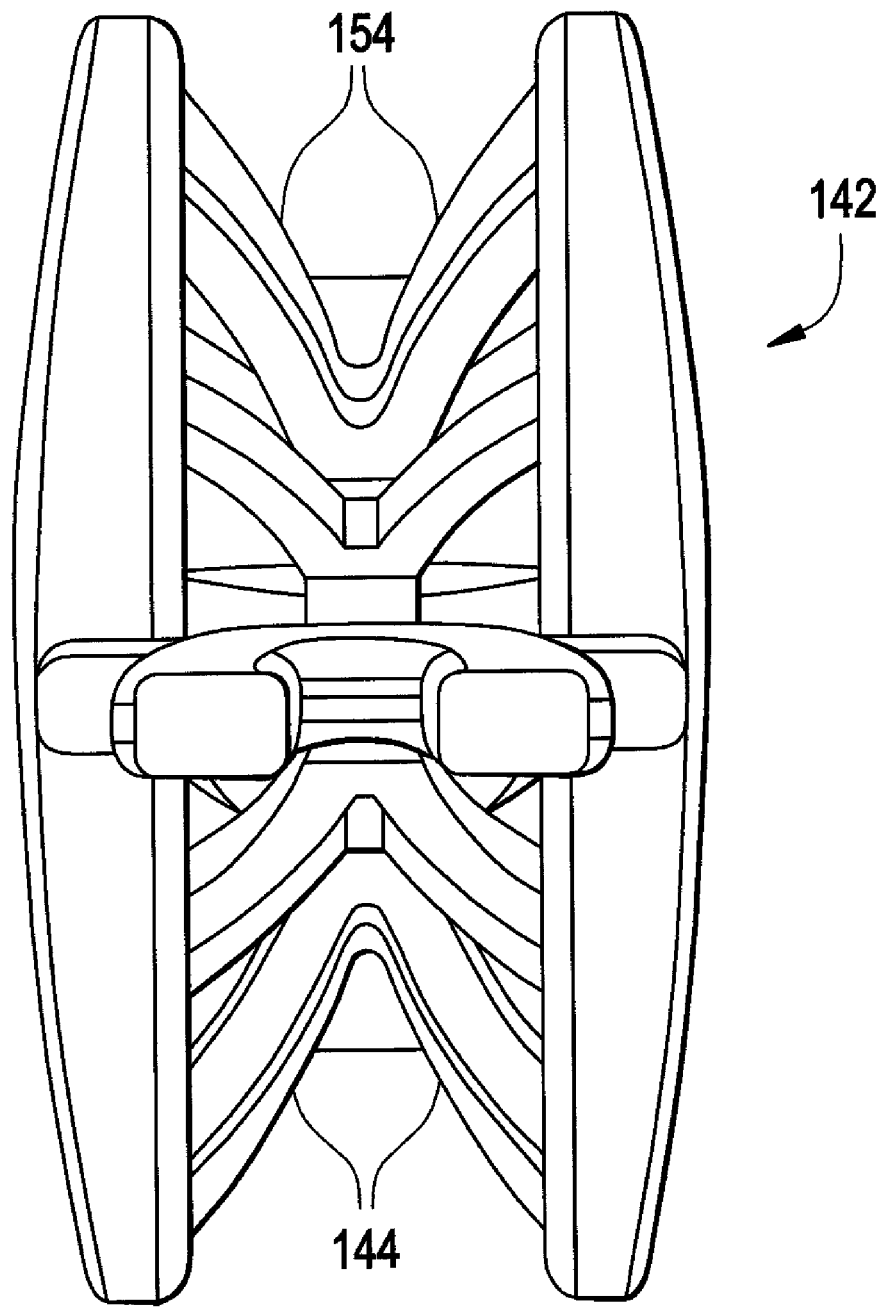
FIG. 25 is a bottom view of the stem component shown in FIG. 23.

As shown in FIG. 23, much like the stem 42 previously described, the stem 142 of lens case 140 has two, back-to-back cages 144 disposed thereon. The cages 144 may be engaged with the stem 142 in a snap-fit arrangement. Alternatively, the cages 144 may be integral with the stem 142 (for example, the stem 142 and cages 144 may be a single, plastic molded piece as shown in the figures). Regardless, preferably the cages 144 are positioned in back-to-back orientation, with their convex sides 154 facing each other.

Preferably, one end 156 of the stem 142 is configured for engagement with the inside 157 of the cap assembly 146. Specifically, the end 156 of the stem 142 may provide a square-like shape profile which inserts in a corresponding recess 159 defined by an extended square wall 177 on the inside surface 157 of the cap assembly 146. As shown in FIG. 23, the end 156 of the stem 142 may provide a plurality of protrusions 161 which insert in corresponding apertures 163 formed in the square wall 177 on the inside surface 157 of the cap assembly 146, in a snap-fit engagement.

Preferably, the opposite, distal end 158 of the stem 142 is configured to receive the catalyst 48. To that end, as shown in FIG. 23 fingers 165 having indentations 160 may be provided on the stem 142, near its distal end 158, for receiving and retaining the catalyst 48.

Figure 21:
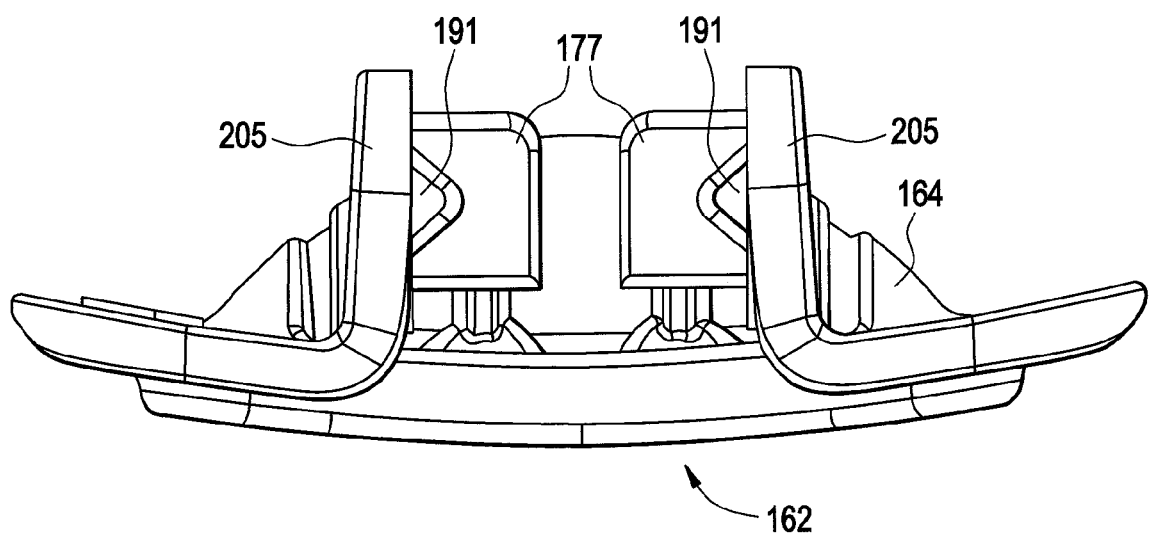
FIG. 21 is a top view of the hinged member shown in FIG. 19.
Figure 22:
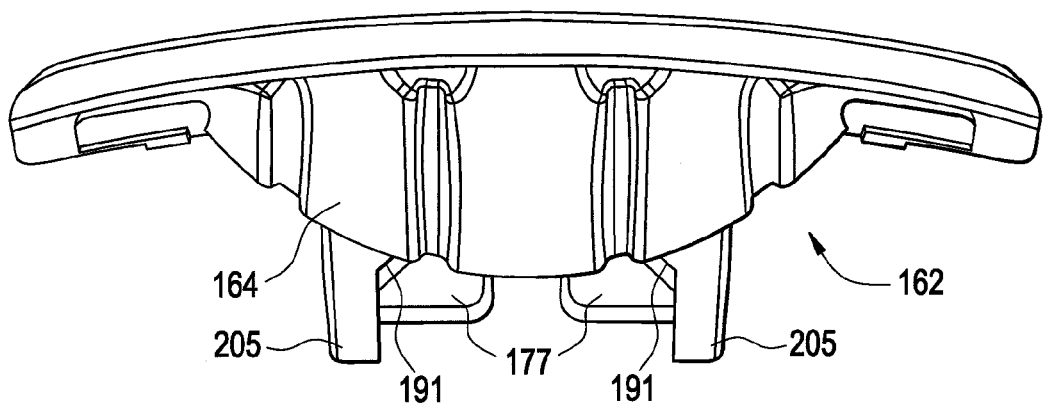
FIG. 22 is a bottom view of the hinged member shown in FIG. 19.

As shown in FIGS. 15-18, hinged members 162 are engaged with the stem 142 and each of the hinged members 162 includes a lens-receiving structure 164 such as a dome-shaped portion for retaining contact lenses thereon. The hinged members 162 are preferably non-planar (see FIGS. 21 and 22 which provides top and bottom views of one of the hinged members, with the other hinged member being virtually identical, but for a different indicia to indicate the other eye) which allows the lens-receiving structures 164 to be provided on the hinged members 162 rather than having to be on the stem 142, and allows the use of deep larger diameter, back-to-back cages 144 on the stem 142, without having to resort to using more than 10 cc's of fluid to immerse contact lenses that are disposed on the lens-receiving structures 164, between each of the lens-receiving structures 164 and a respective cage 144. Each of the hinged members 162 is cylindrically-curved, having a cylindrically-curved shell form in which the axis of its curve is approximately parallel to the central axis of the central planar stem member 142. Specifically, the central axis of each lens cage is disposed parallel to the geometric plane described by the stem 142. Additionally, the central axis of pivoting for each hinged member 162 is perpendicular to the geometric plane described by the stem.

Each hinged member 162 is configured to mount and pivot within fixed hinge pin receptacles 179 which are provided upon a common center opposite one another on each side of the stem 142. To this end, small inward facing pin structures 177 are provided on support ears 205 of the hinged members 162, and these pin structures 177 mount and rotate within the hinge pin receptacles 179 formed on the stem 142 as the hinged members 162 are being opened and closed. As shown in FIG. 23, the cylindrical receptacles 179 are positioned perpendicular to the plane of stem 142 and share a common axis with one another on opposite sides of stem 142. The receptacles 179 each have aligned receiving slots 185 positioned to allow insertion of the hinge pins 177 into an inner cylindrical bore 188 in the receptacles 179.

Figure 28:
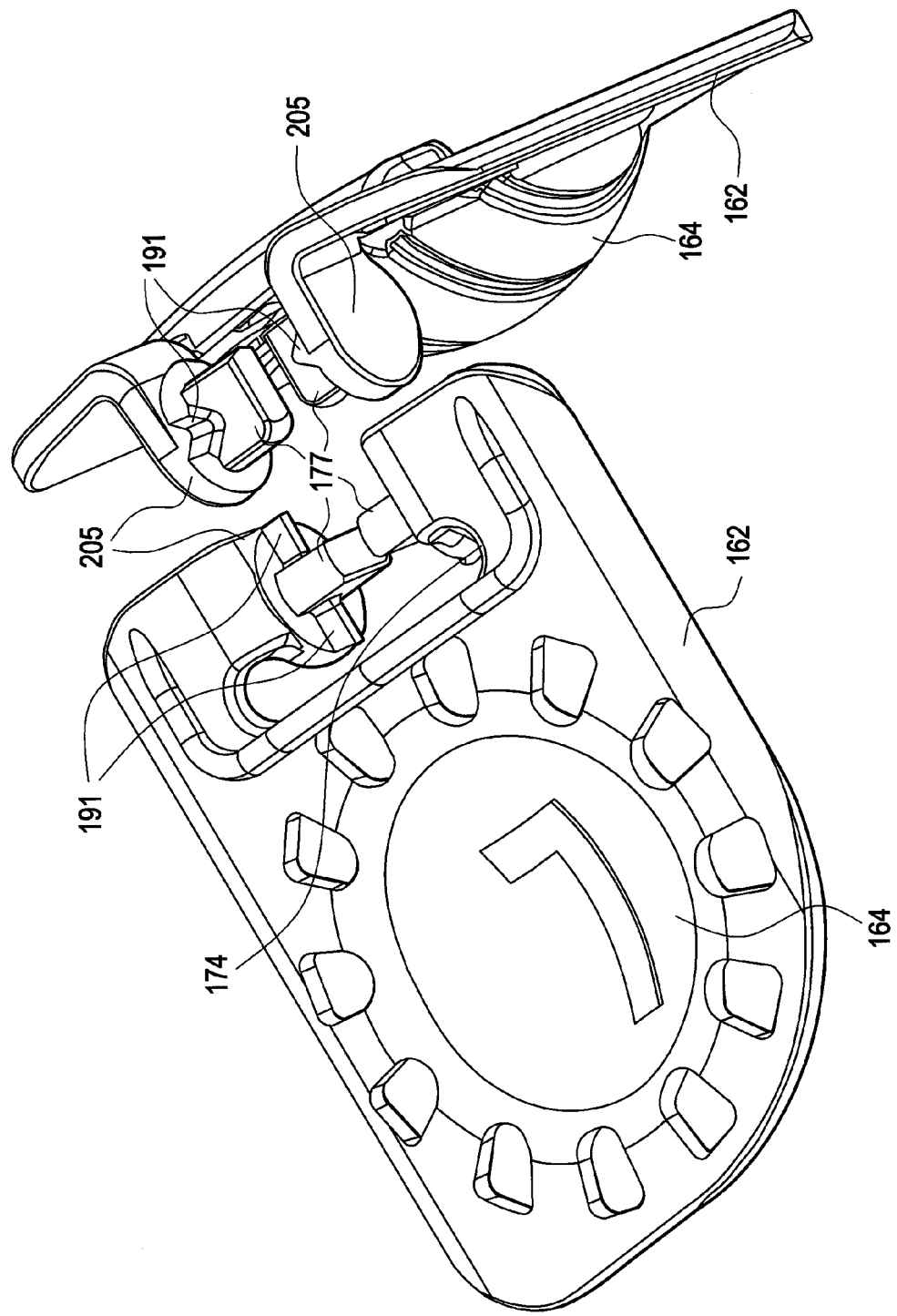
FIG. 28 shows the hinged members of the contact lens case of FIGS. 15-18 isolated, with one in the open position and one in the closed position.

Much like as with the contact lens case 40, the hinge pins 177 are configured to snap into the pin receptacles 179. Compared to the hinge pins 77 of the contact lens case 40, the hinge pins 177 of the contact lens case 140 have been rotated 90 degrees (compare pin 77 as shown in FIG. 14 to pin 177 as shown in FIG. 28) on their common axis such that when the hinged members 162 are installed, they are already in the natural closed position (as shown in FIGS. 15-18). This saves time during assembly and simplifies the process by eliminating any requirement to subsequently fold the hinged members 162 into their closed position after installation. This planar hinge pin orientation also serves to add extra resistance beyond the snap in feature against a hinged member 162 being accidentally pulled from its socket 179 while in an open position, since the planar hinge pin 177 is traverse to its receiving receptacle 179 instead of being in line with it.

Figure 16:
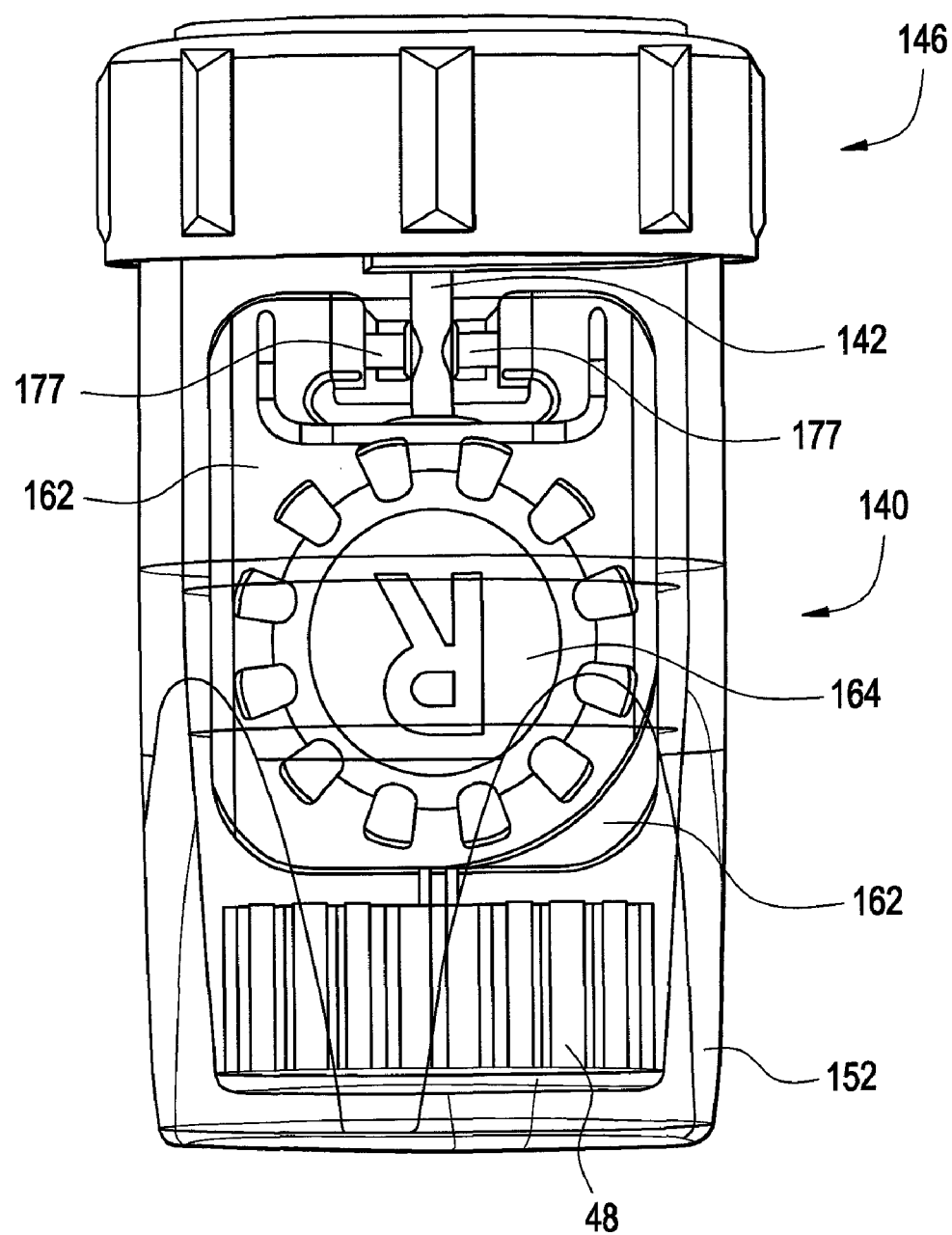

As such, when a hinged member 162 is pivoted open, the lens-receiving structure 164 of the hinged member 162 becomes exposed, ready to receive a contact lens. As shown in FIGS. 15-18, much like the cap 46 previously described, preferably the cap assembly 146 of lens case 140 is generally shaped flat on its top in order to sit stable, inverted on a table surface while lenses are being delivered for disinfection or removed after disinfection. Once a contact lens is positioned on the lens-receiving structure 164, the hinged member 162 can be pivoted closed, such that its lens-receiving structure 164 and the respective cage 144 on the stem 142 effectively mate, retaining a contact lens therebetween. As shown in FIGS. 16 and 17, each of the hinged members 162 preferably has a right/left indicator 172, so that a user knows which contact lens is supposed to be engaged with that particular lens-receiving structure.

Figure 19:
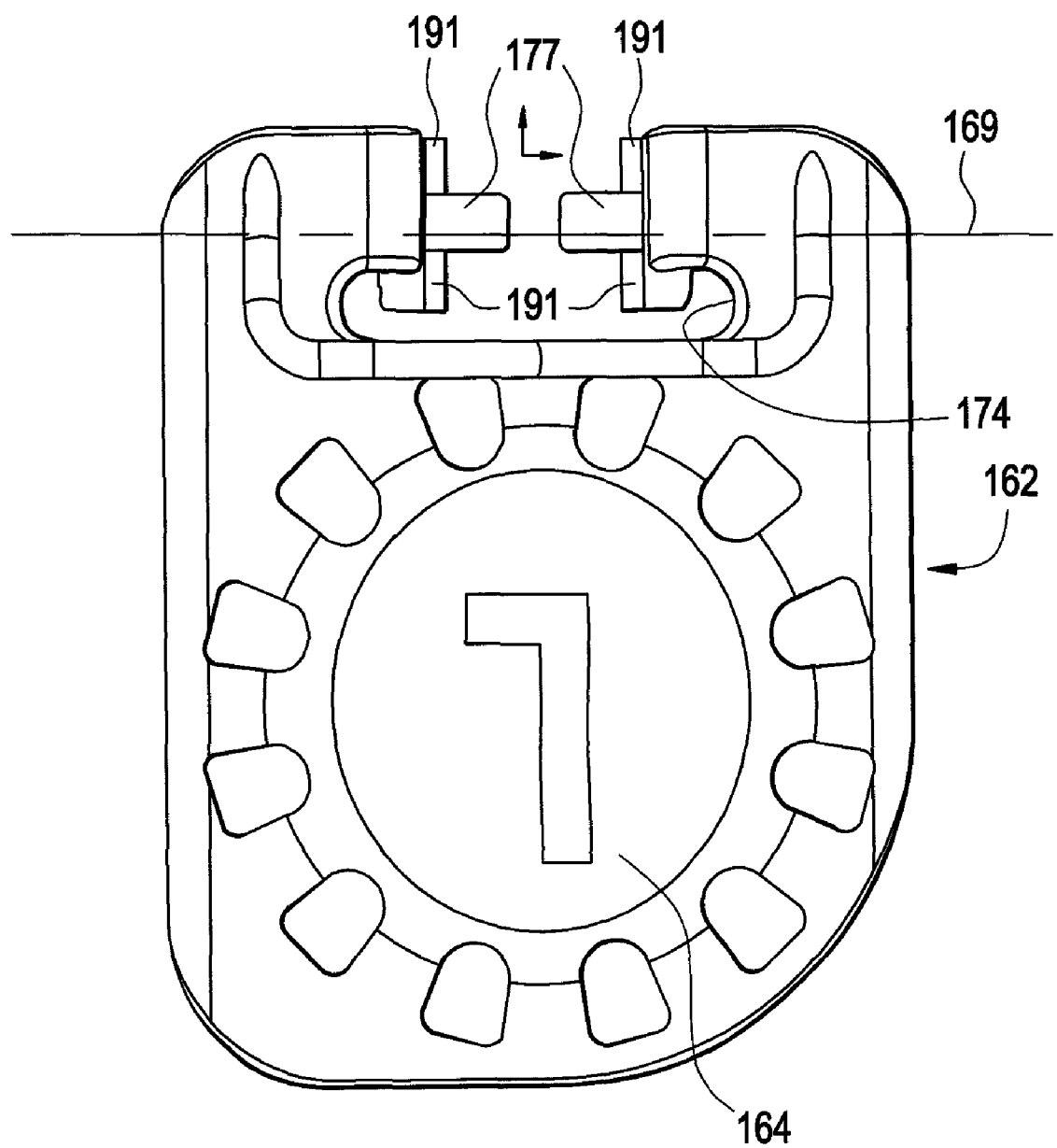
FIG. 19 is a rear view of a hinged member of the contact lens case shown in FIGS. 15-18.
Figure 20:
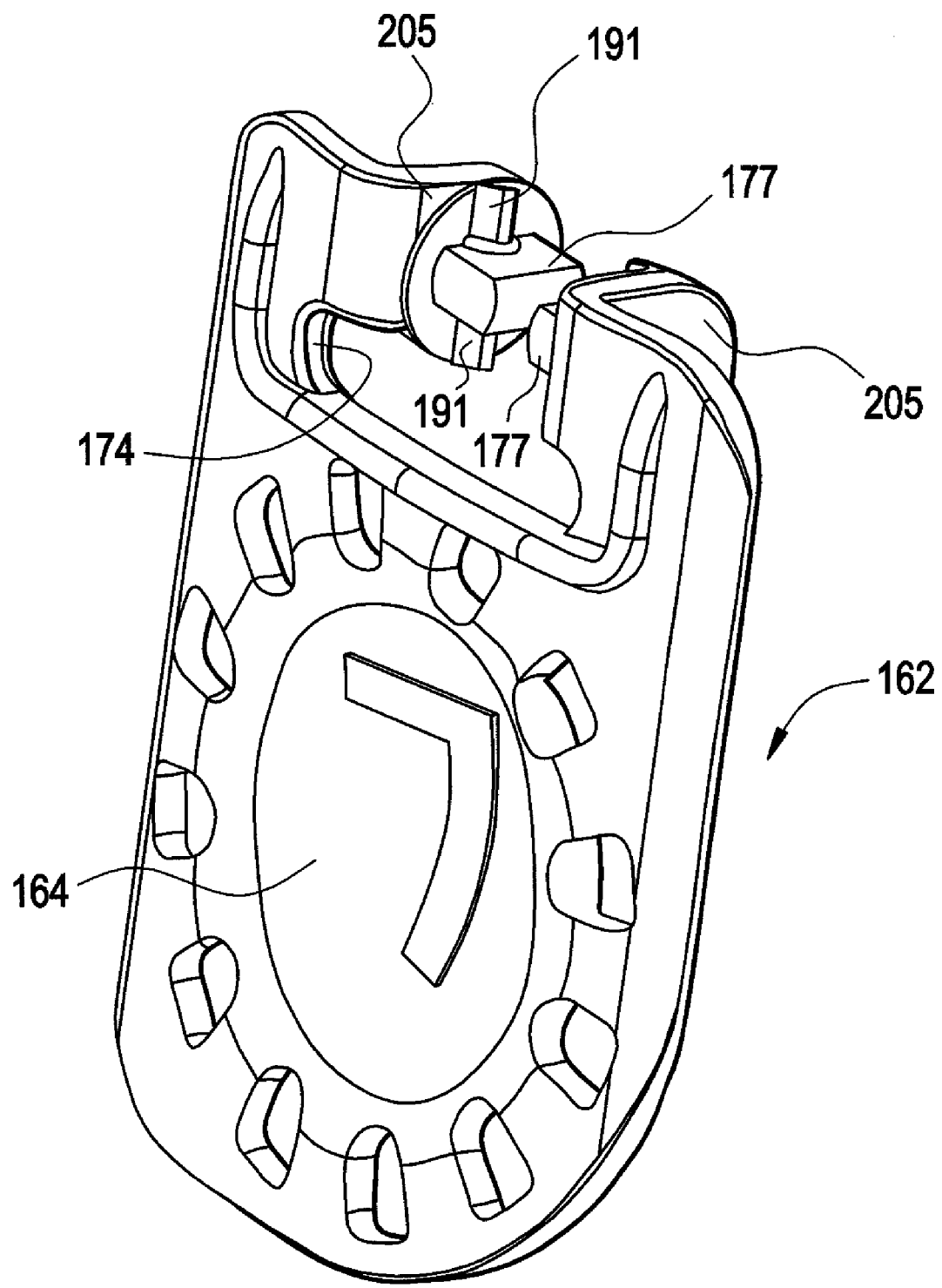
FIG. 20 is a perspective view of the hinged member shown in FIG. 19.

With regard to a detention feature (i.e., a feature for retaining the hinged members 162 in either the open or the closed position), for better control and reliability, each hinged member 162 not only has a pin 177 but also cam followers 191 which are provided transverse to each planar hinge pin 177. The cam followers 191 provide a cam action with regard to a hinge pin cam surface 181 which is on the face 167 of each cylindrical receptacle 179. Compared to the cam surface 81 which is provided on the contact lens case 40 previously described, the cam surface 181 of the lens case 140 is provided on the cylindrical face 167 of each cylindrical receptacle 179, thereby positioning each feature further from each hinge pin's rotational axis 169 (see FIG. 19). This allows more tolerance for variation of both the cam followers 191 and the hinge pin cam surface 181. Moving further from the rotational axis also provides better mechanical advantage for interacting detenting elements to retain hinged members 162 in both open and closed positions.

Figure 27:
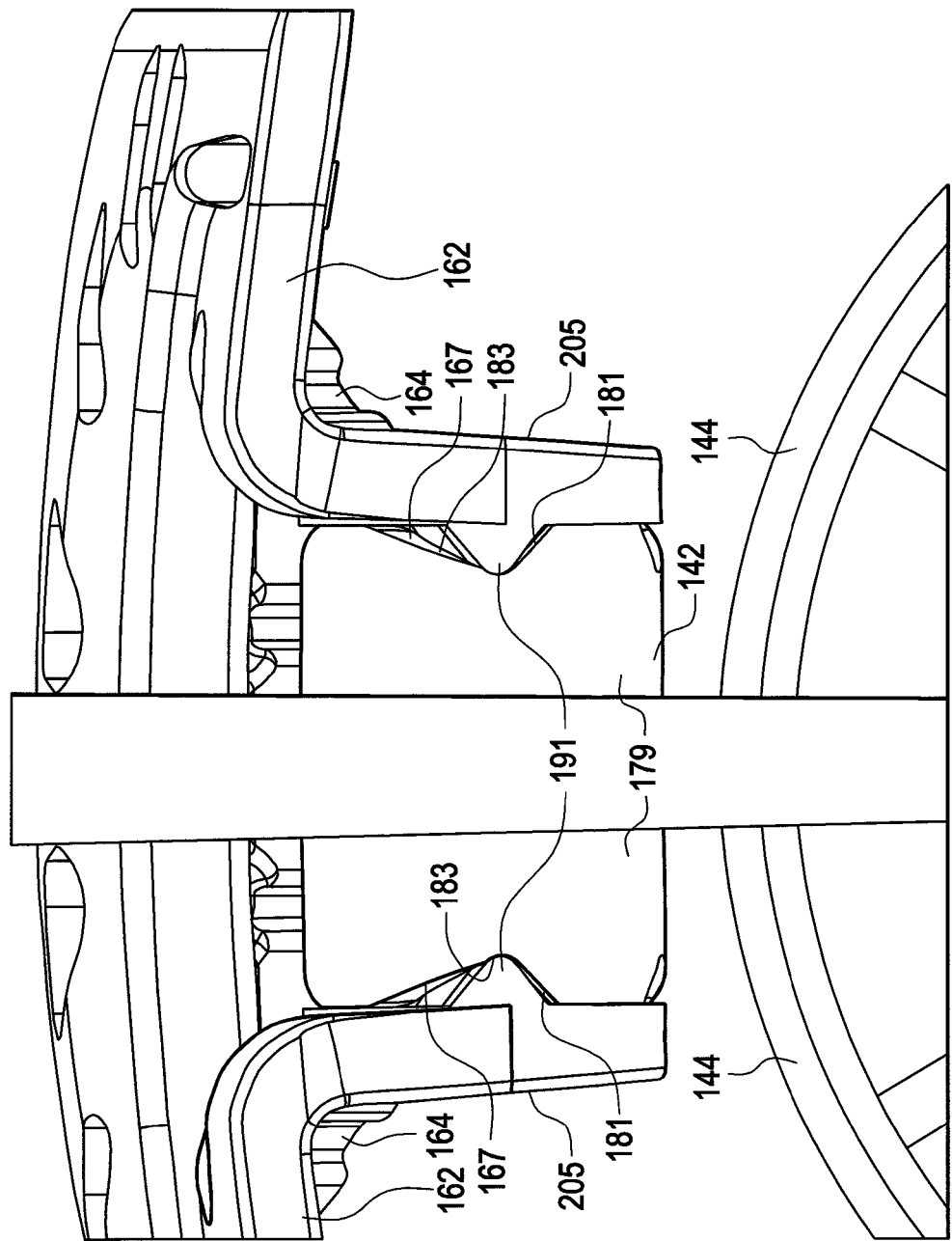
FIG. 27 shows the position of cam followers when the hinged members of the contact lens case of FIGS. 15-18 are in the open position.
Figure 35:
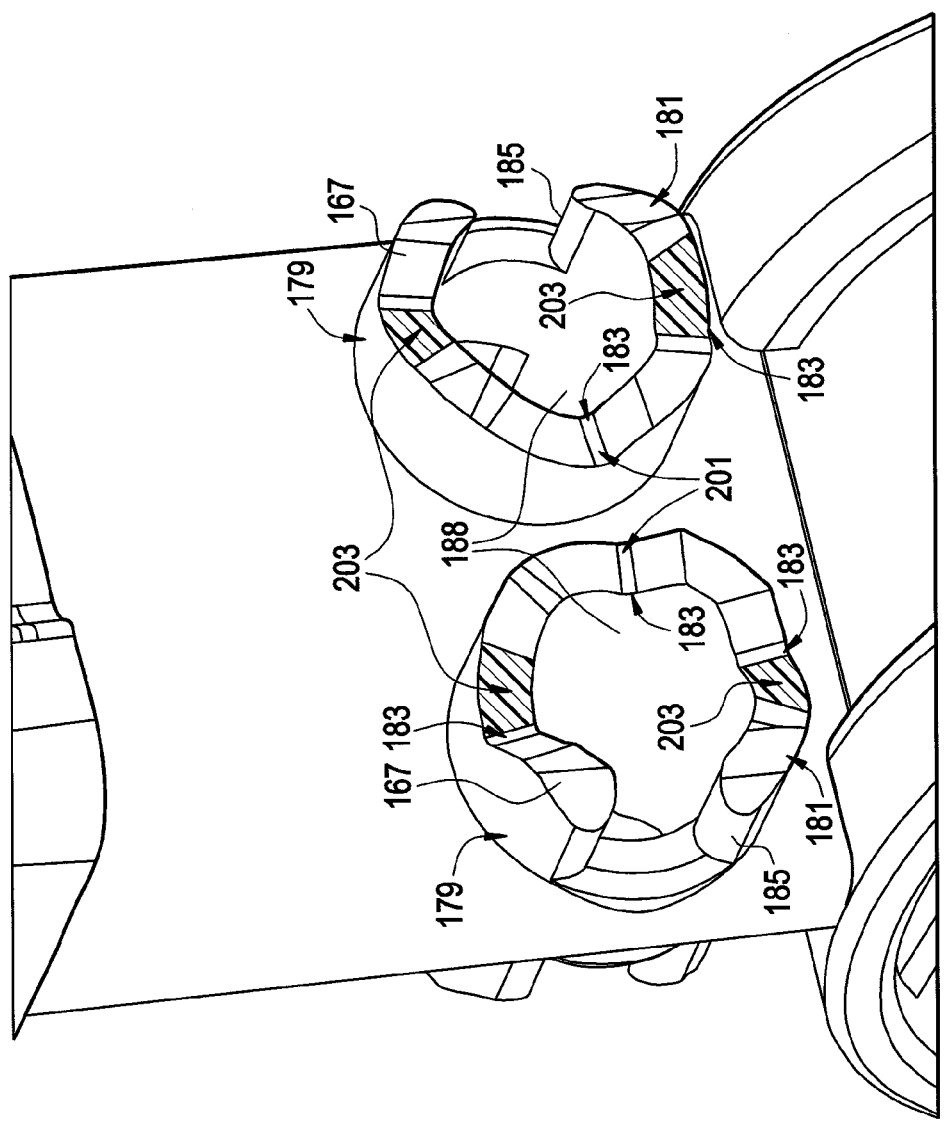
FIG. 35 is a view which shows the notches and ramps of cam surfaces which are provided on the face of receptacles on the stem of the contact lens case shown in FIGS. 15-18.

Each hinge pin cam surface 181 consists of a plurality of "V"-shaped cam notches 183, including a "hold open" cam notch 201 and "hold closed" ramps 203. As a hinged member 162 is pivoted open, the cam surfaces 191 ride across the "hold closed" ramps 203 into the "hold open" cam notch 201 (see FIGS. 27 and 35). Regardless of whether the hinged member 162 is in the open or closed position, the hinged member 162 tends to stay in that position unless intentionally pivoted by a user. Movement of both hinged members 162 from an open or closed position to the opposite position causes the cam followers 191 to ride over a ramp of the cam surface 181, urging the cam followers 191 outward, forcing the ears 205 of the hinged members 162 away from each other. Once the cam followers 191 arrive in a notch, the ears 205 spring back to their original location and distance from each other. Spring action to allow the cam followers 191 to traverse over the ramps of the cam surface 181 and travel into notches of the cam surface 181 results from elastic deformation of the ears 205 of the hinged members 162. Slot interruptions 174 on the hinged members 162 assist in keeping deformation stresses resulting from traversing cam followers 191 within the elastic deformation limits of hinged member 162 and below the point of permanent plastic deformation. This detenting feature is desirable in order to facilitate delivery of lenses to the lens-receiving structures 164 and to prevent movement of the hinged lens-receiving structure 164 during retrieval of a disinfected lens.

Because the final location of the hinged members 162 when open occurs in space and is not dictated by any other structure, the hinged members 162 may be held open by engaging a simple matching "V" shaped cam notch 201 (as previously described) appropriately positioned on the cylindrical receptacle's end face 167. For retention in the closed position and in order to assure full closure to prevent loss of a lens during disinfection, it is preferable to have a mechanism that automatically urges each hinged member 162 into a position snuggly abutting the stem 142, preferably with a small amount of sustained spring force such that looseness or gapping between stem 142 and hinged member 162 is prevented when closed. Each of the four cam followers 191 provided transverse to adjoining planar hinge pins 177 engages one of four appropriately placed closing cams provided on surface 181, thereby keeping torque loads balanced and preventing undesirable sustained twisting loads against the hinge pin support ears 205.

Figure 26:
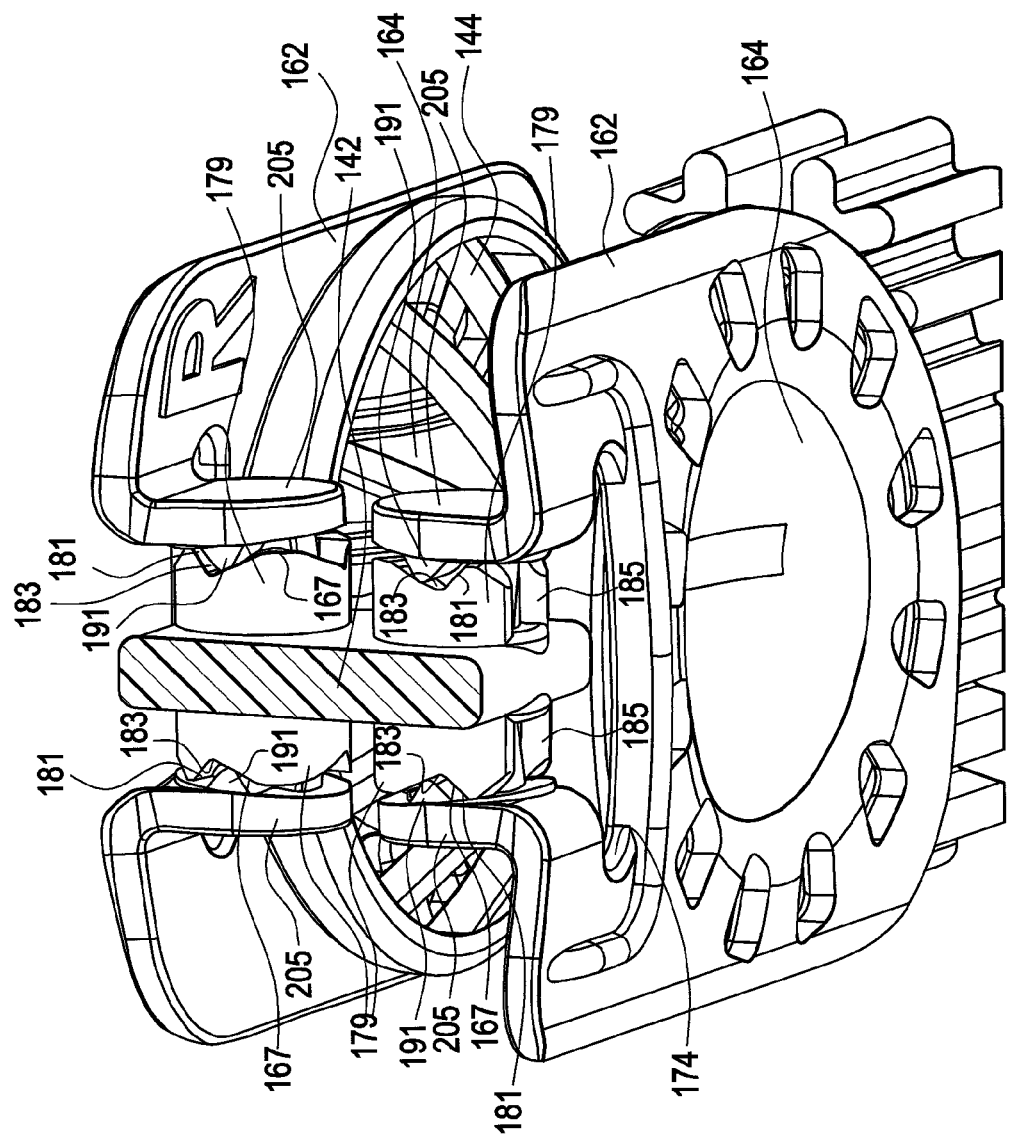
FIG. 26 shows the position of cam followers when the hinged members of the contact lens case of FIGS. 15-18 are in the closed position.

Since each hold closed cam is equipped with a hold closed ramp 203 having extra travel allowance to assure sustained closure force, the deepest points of the hold open and hold closed cams are positioned greater than 90 degrees relative to one another. As shown in FIG. 26 (see also FIG. 35), when the hinged members 162 are in the closed position, the cam followers 191 sit on the ramps 203 rather than in the notch 201 (i.e., in the lowest point of the cam). Although the hinge pin supporting ears 205 are preferably specifically designed for flexing in order to prevent an over-stressed condition leading to fracture, it is necessary to take care that the location and timing of the hold closed cam ramps 203 are such that only minimum sustained outward deflection is applied to the supporting ears 205 while in a closed position.

The hinged elements 162 on the planar stem 142 are preferably cylindrical in nature, each with slot interruptions 174 (see FIGS. 19, 20, 26 and 28) located 180 degrees from one another in a plane perpendicular to the center line of the planar stem 142 to allow flushing and drainage and avoid trapping fluid while in an upright or inverted position. Additionally, as shown in FIG. 23, preferably a top surface of the stem 142 is shaped such that it provides internal vent ports 199.

Preferably, the abutting mating faces of each cage 144 and its respective hinged members 162 are curved to match one another. An assembly of the planar central stem 142 with back-to-back lens cages 144 and mating curved hinged members 162 on either side results in a package that does not require as large a cup diameter to accommodate the internal components as would be required if the cages and lens-receiving structures were instead to be provided as having flat faces. Preferably, the case is configured such that use of curved, lens-receiving structure-carrying hinged members 162 allows a desirable lens cage inner base diameter of 0.75 inches to be employed without losing full lens immersion with 10 cc's of lens solution.

Making the lens-receiving structure 164 an integral, thin-walled and continuous element of the hinged member 162 allows a precise lens-receiving structure form to be quickly molded in a repeatable reliable manner without distortion or sink. Lens-receiving structures formed in this manner can be designed to optimize features necessary for preferential retention of lenses during placement and after disinfection or storage.

Figure 32:
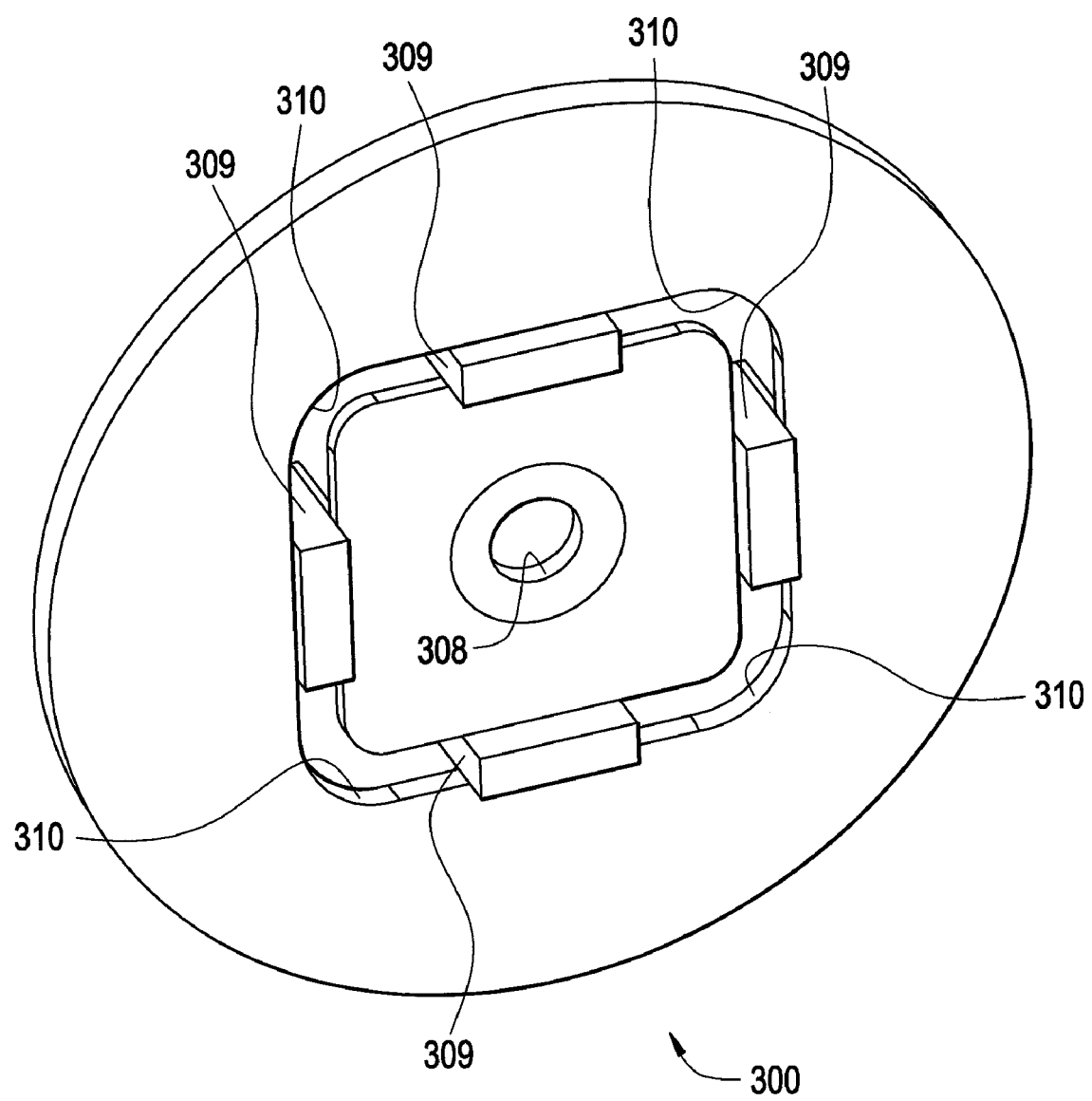
FIG. 32 is a bottom perspective view of the gasket shown in FIG. 31.
Figure 33:
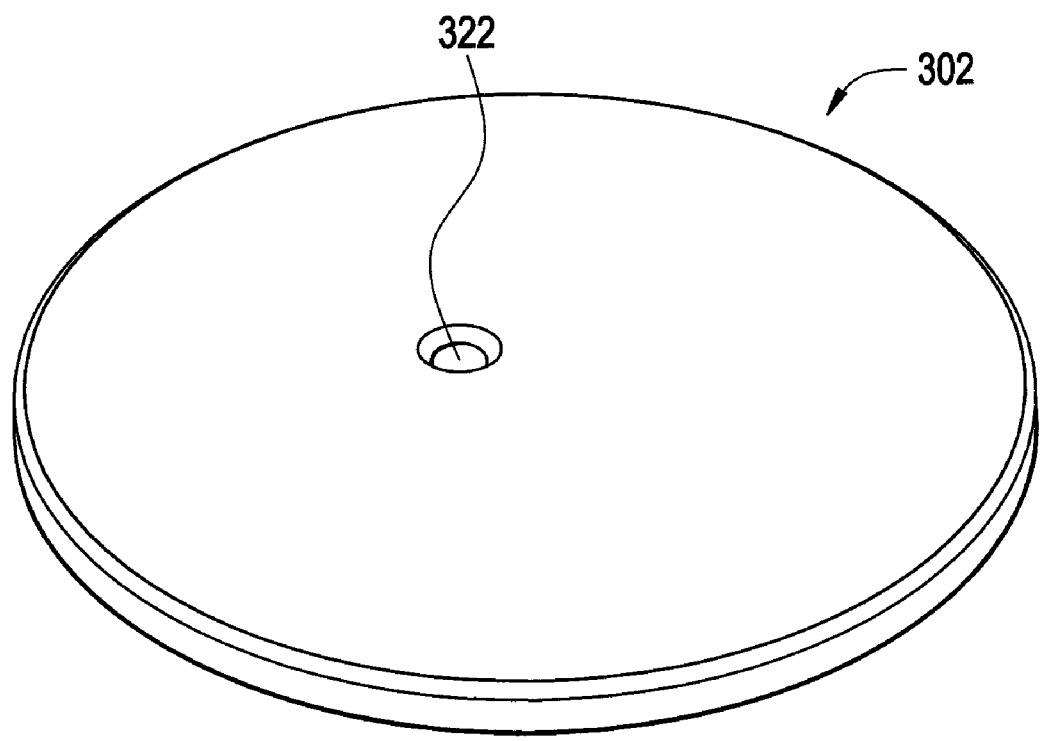
FIG. 33 is a top perspective view of a plug component of the contact lens case shown in FIGS. 15-18.
Figure 34:
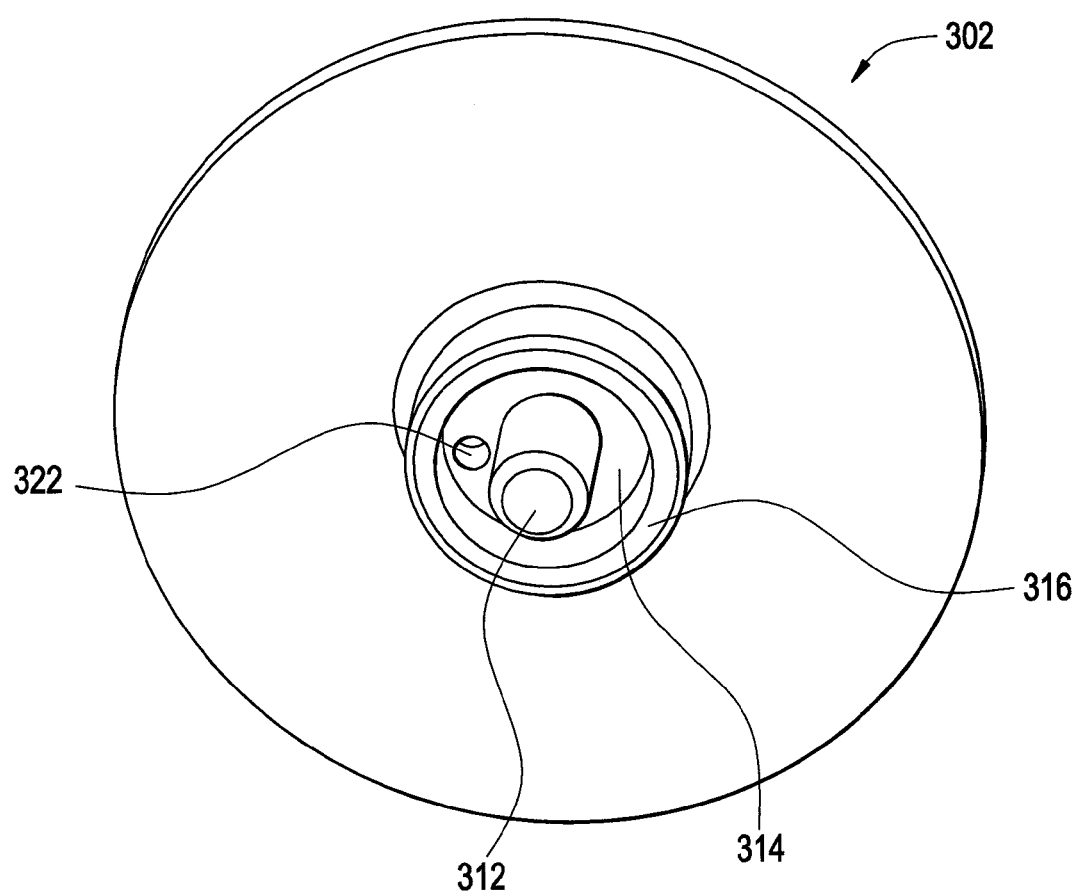
FIG. 34 is a bottom perspective view of the plug shown in FIG. 33.
Figure 36:
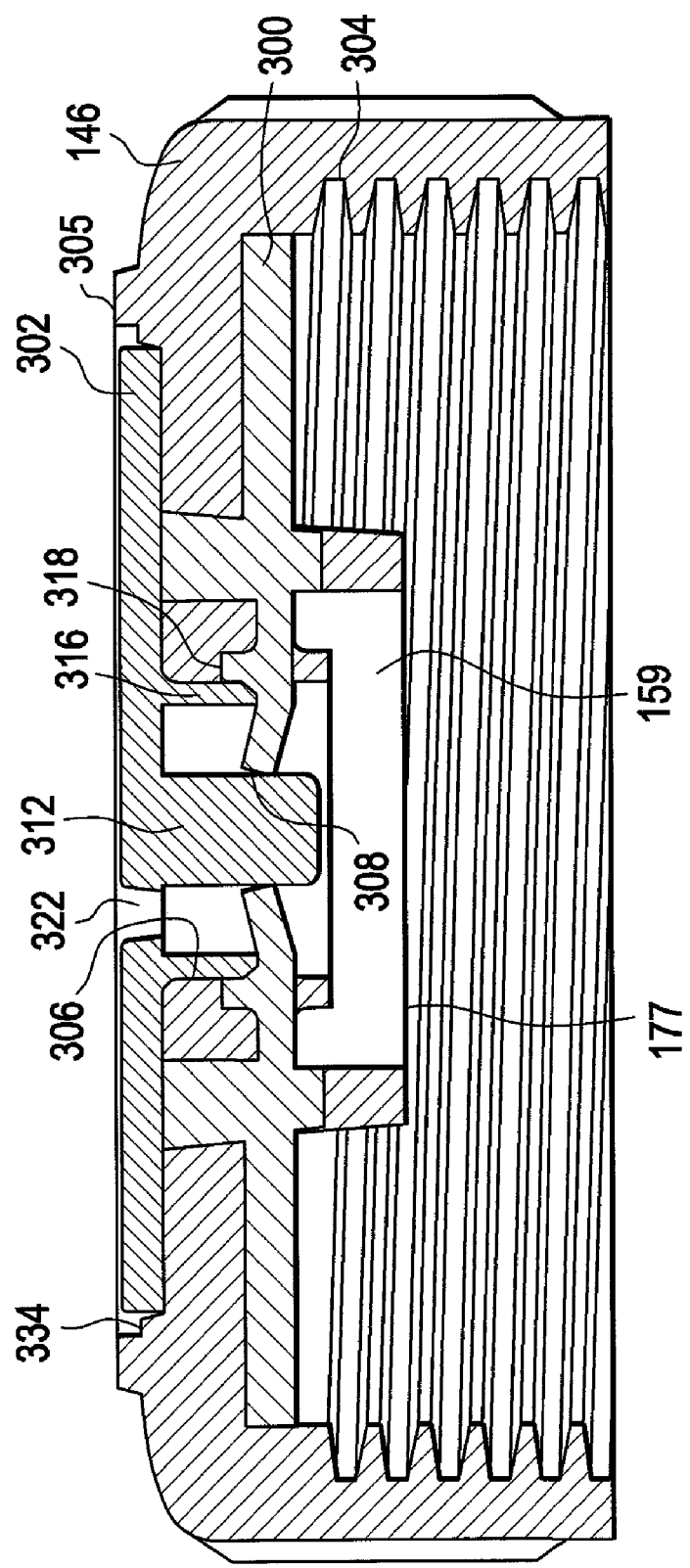
FIG. 36 is a cross-sectional view of the cap assembly of the contact lens case which is shown in FIGS. 15-17.

Other components of the contact lens case 140 include a sealing gasket 300 (shown in FIGS. 31 and 32) with an integrally formed vent hole 308 and a plug 302 (shown in FIGS. 33 and 34). The sealing gasket 300 is molded in place, fused within the cap 146. As such, the gasket 300 does not exist as a separate component, separate from the cap 146. Nevertheless, for clarity with regard to understanding the shape of the gasket 300, the gasket 300 is shown alone in FIGS. 31 and 32). While the gasket 300 is fused in place within the cap 146 when it is molded in place, the plug 302 is configured to engage the gasket 300 such that the three components, when assembled, provide an overall cap assembly (a cross-sectional view of which is shown in FIG. 36). Preferably, the cap 146 has a flat top surface 305 (for resting on a tabletop or counter), a threaded surface 304 for threadably engaging the top 150 of the cup 152, and a venting feature which will be described in more detail later hereinbelow.

Figure 29:
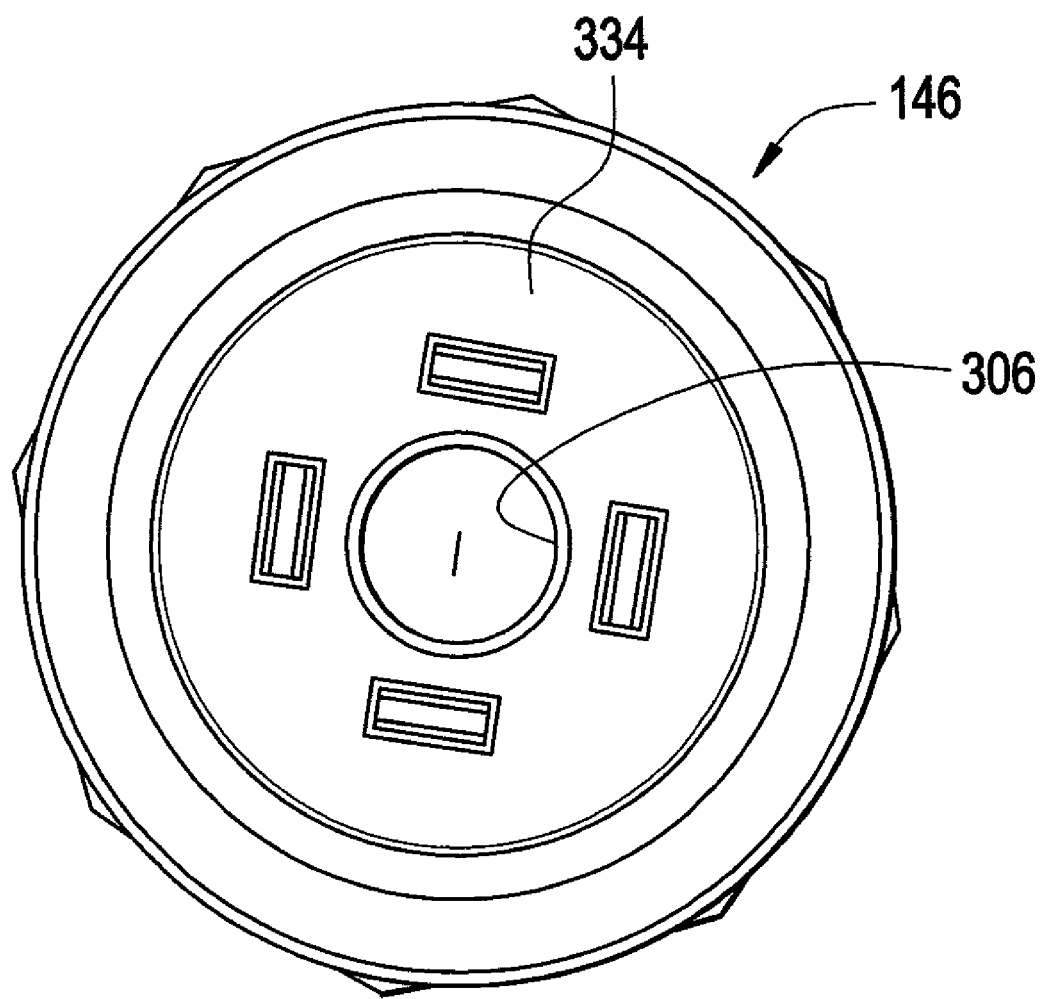
FIG. 29 is a top view of the cap of the contact lens case shown in FIGS. 15-18.
Figure 30:
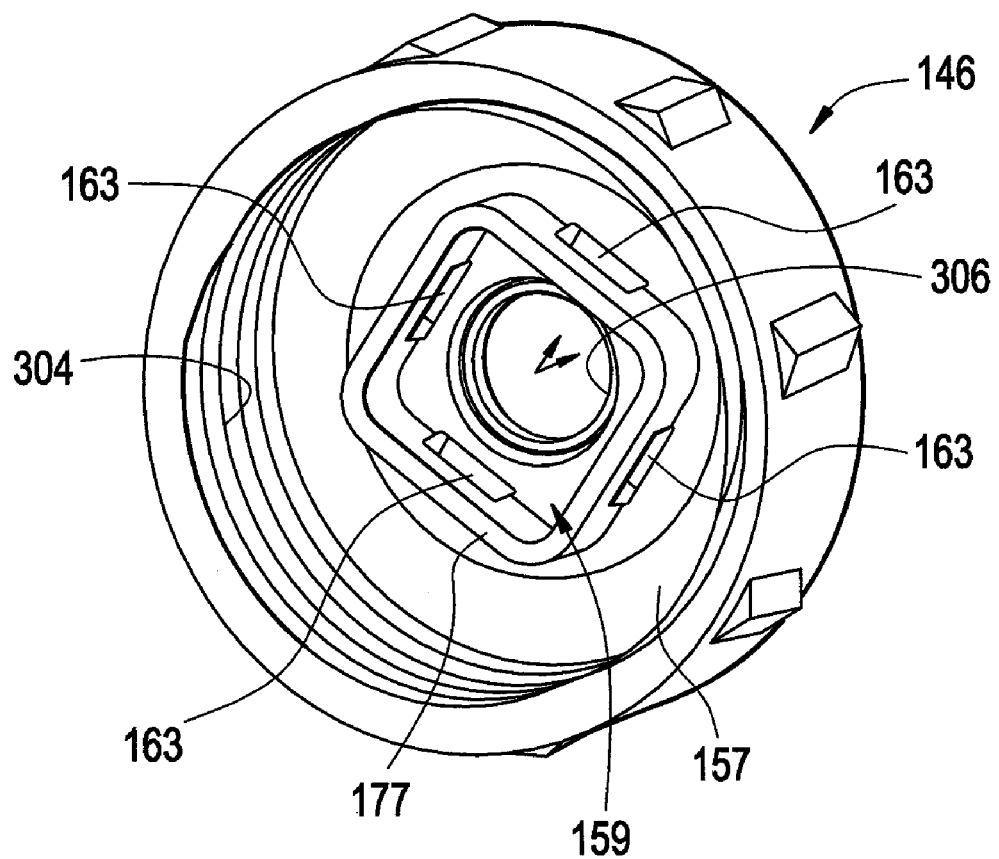
FIG. 30 is a bottom perspective view of the cap of the contact lens case shown in FIGS. 15-18.
Figure 31:
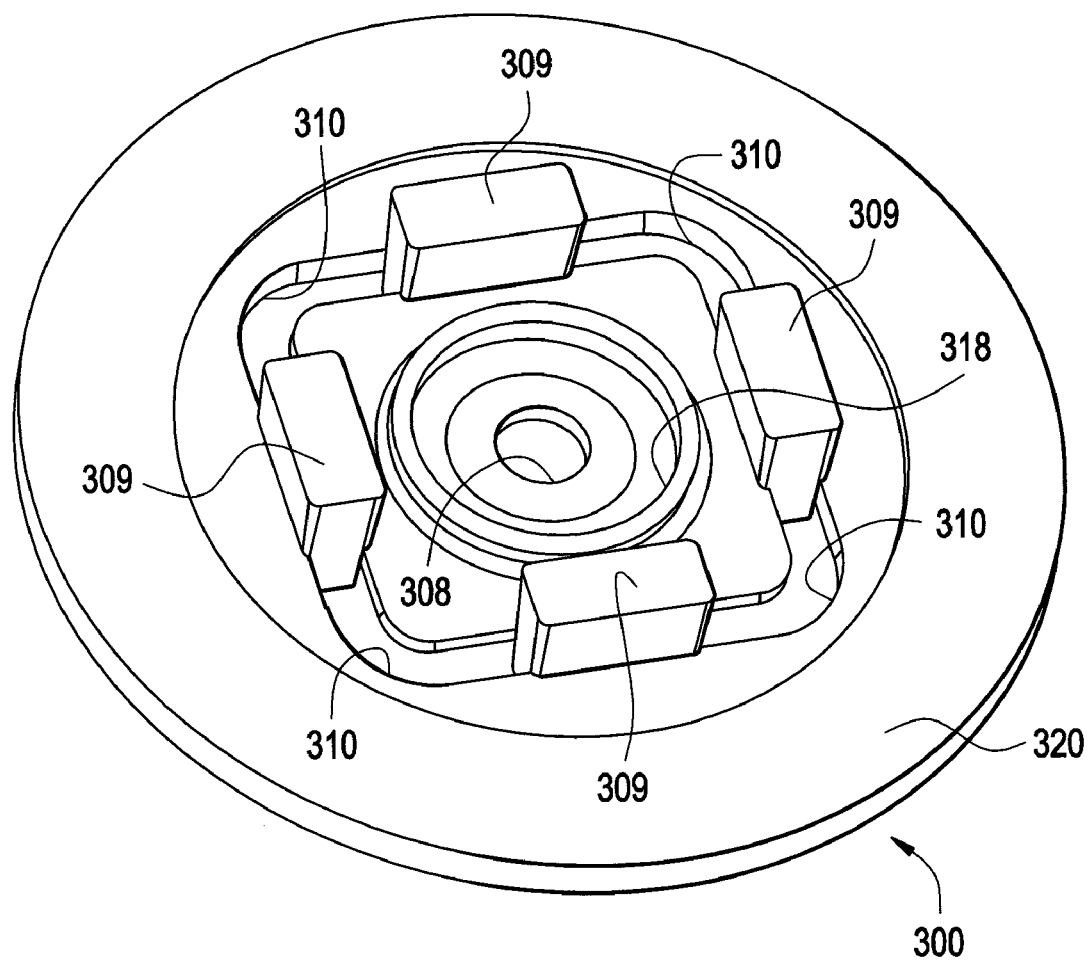
FIG. 31 is a top perspective view of a gasket component of the contact lens case shown in FIGS. 15-18.

In addition to the four apertures 163 on the cap 146, the cap 146 includes a center hole 306 as shown in FIGS. 29 and 30. The gasket 300 includes four extending walls 309, and the walls 309 are formed in the apertures 163 in the cap 146 when the gasket 300 is molded and fused in place to the inside surface 157 of the cap 146. As these walls 309 are made out of elastomeric material, they compress and deflect out of the way of protrusions 161 (see FIG. 23) to allow a snap fit engagement. The gasket 300 also has a center vent hole 308, and openings 310 which are formed between the four extending walls 309. As shown in FIG. 34, the plug 302 includes a stem 312 on its inner surface 314, and this stem 312 inserts in the center hole 306 of the cap 146 and in the center vent hole 308 of the gasket 300. Surrounding the stem 312 of the plug 302 is a circular wall 316, and this circular wall 316 extends through the center hole 306 of the cap 146 and seats against a corresponding circular wall 318 which is provided on the top 320 of the gasket 300 as shown in FIG. 31. As shown in FIGS. 33, 34 and 36, a vent hole 322 is provided on the plug 302, disposed in an area between the stem 312 and the circular wall 316, to provide a venting feature. When assembled, the plug 302 seats in a recessed seat 334 which is provided on the cap 146, and the pin 312 extends through the center vent hole 308 in the gasket 300.

Figure 37:
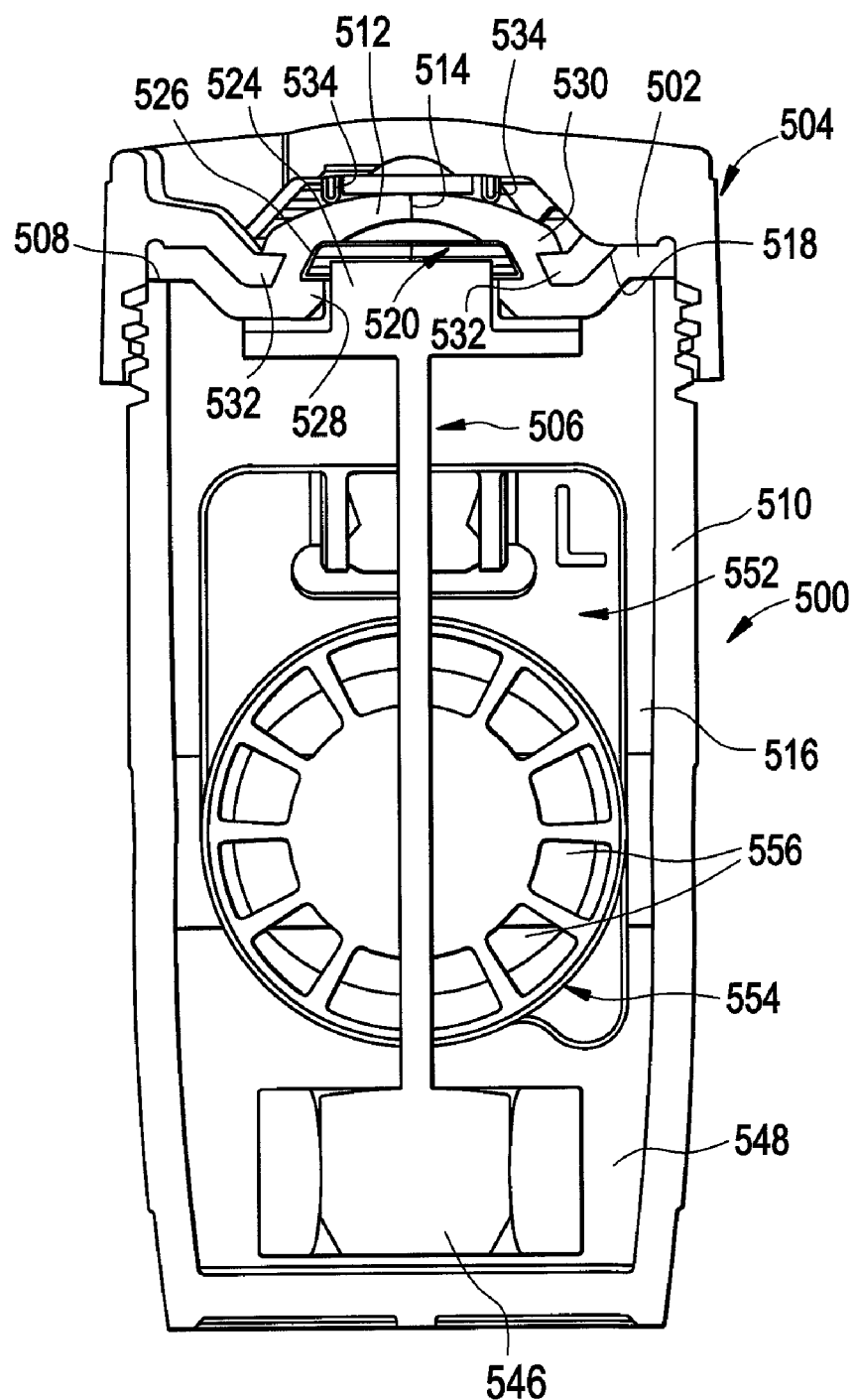
FIG. 37 is a side view, in partial cross-section, of a contact lens case which is in accordance with an alternative embodiment of the present invention.
Figure 38:
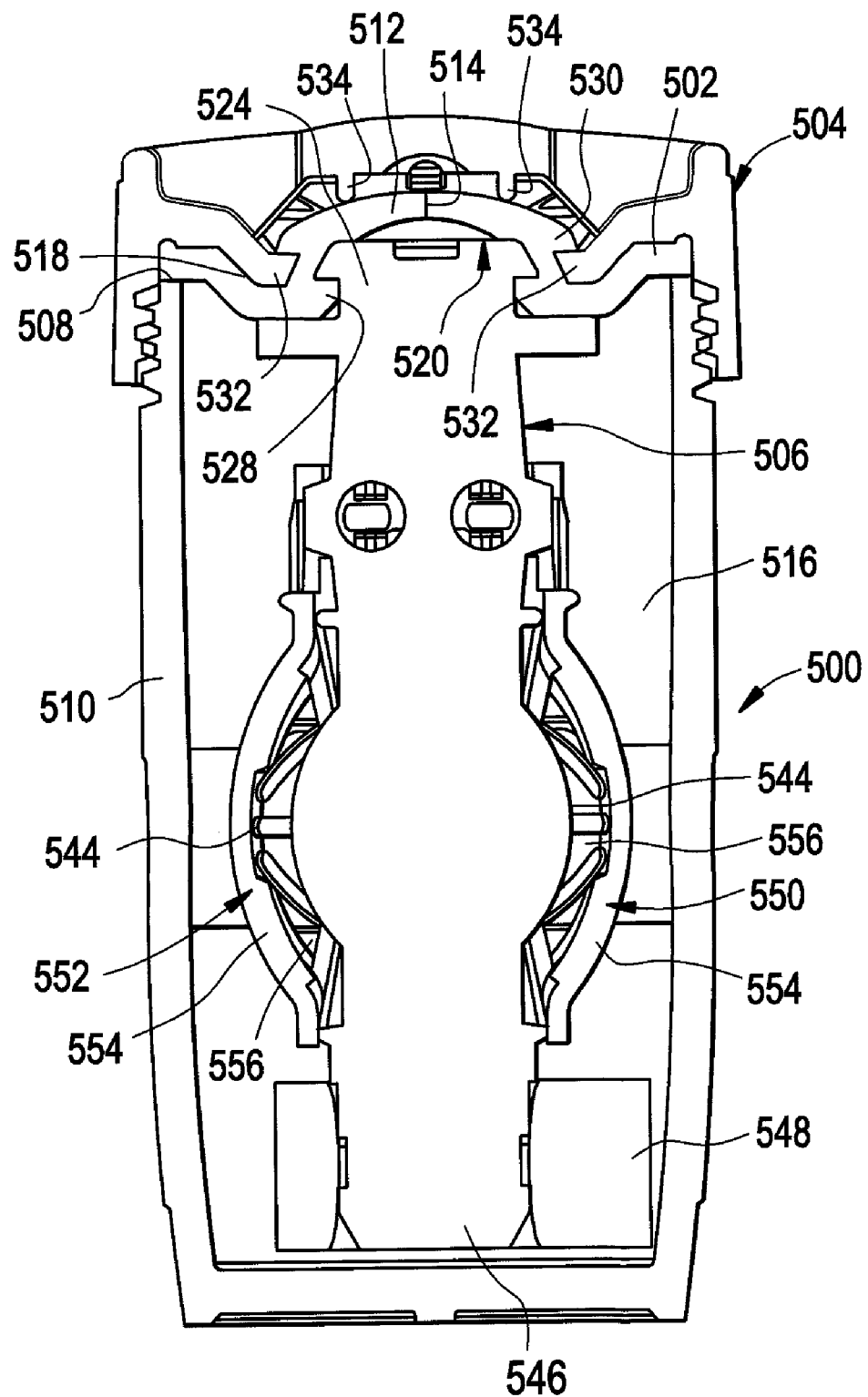
FIG. 38 is a view similar to that which is shown in FIG. 37, but which is rotated 90 degrees.

FIGS. 37 and 38 illustrate yet another embodiment of the present invention. Specifically, FIGS. 37 and 38 illustrate a contact lens case 500 which includes a member or diaphragm 502, such as an elastomeric member, which is disposed between the cap 504 and the stem 506. The diaphragm 502 effectively amounts to a combination gasket and vent component, because the diaphragm 502 not only seals with a top edge 508 of the cup 510 when the cap 504 is engaged with the cup 510, but the diaphragm 502 also includes a dome portion 512 that has a vent slit or notch 514 which is configured to open once the inside 516 of the cup 504 reaches a sufficient enough pressure, in order to vent the contact lens case 500.

The diaphragm 502 preferably engages both the stem 506 and the cap 504 in a snap fit arrangement. Specifically, the diaphragm 502 is configured to snap onto the stem 506 and then snap into the underside 518 of the cap 504. In this manner, the diaphragm 502 not only provides gasket and venting features, but also functions to effectively secure the cap 504 and stem 506 together.

Figure 39:
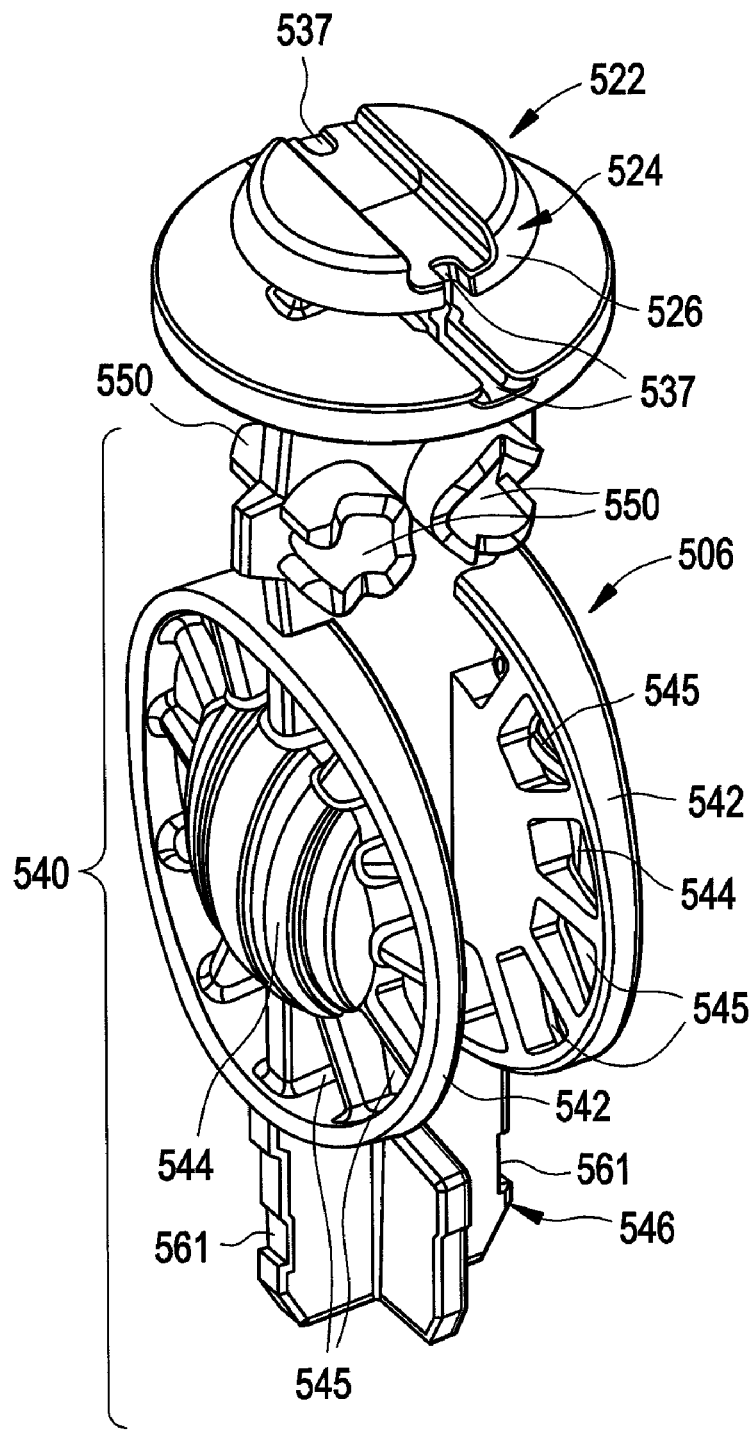
FIG. 39 is a side perspective view of a stem component of the alternative embodiment shown in FIGS. 37 and 38.
Figure 40:
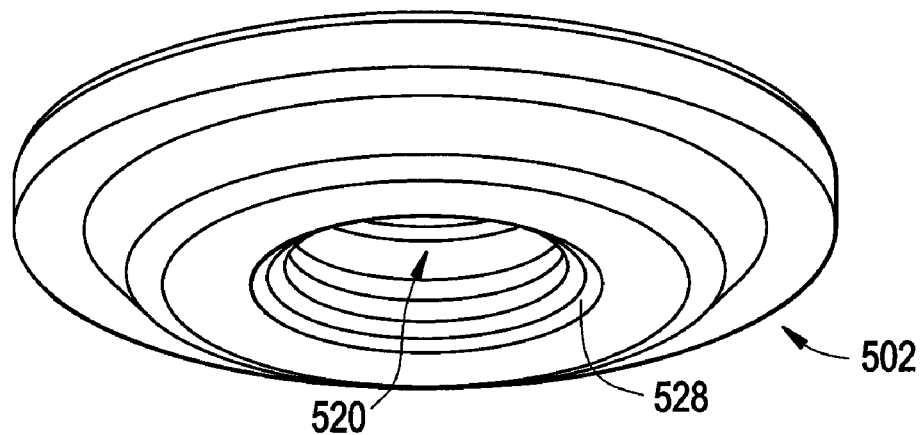
FIG. 40 is a bottom perspective view of a diaphragm component of the alternative embodiment shown in FIGS. 37 and 38.
Figure 41:
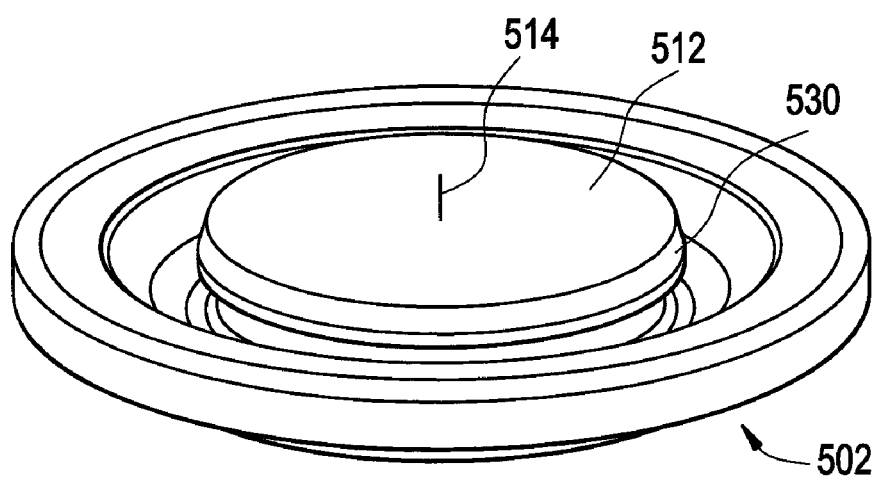
FIG. 41 is a top perspective view of a diaphragm component of the alternative embodiment shown in FIGS. 37 and 38.

More specifically, the diaphragm 502 includes a stem-receiving pocket 520 and the top portion 522 of the stem 506 includes an upwardly extending member 524 which provides a circumferential shoulder 526 (see FIG. 39). An undercut 528 of the diaphragm 502 (see FIGS. 37, 38 and 40) clears and engages under the shoulder 526, thereby providing that the diaphragm 502 is retained on the top portion 522 of the stem 506 in a snap fit arrangement. The diaphragm 502 also includes a lip 530 around the dome portion 512 (see FIGS. 37, 38 and 41) which is configured to receive fingers 532 (see FIG. 42) on the underside 518 of the cap 504, thereby providing that the diaphragm 502 is retained on the underside 518 of the cap 504 in a snap fit arrangement. As such, when the cap 504 is threadably disengaged from the top 508 of the cup 510, the stem 506 remains effectively secured to the cap 504 (via diaphragm 502) as the cap 504 is removed.

Figure 42:
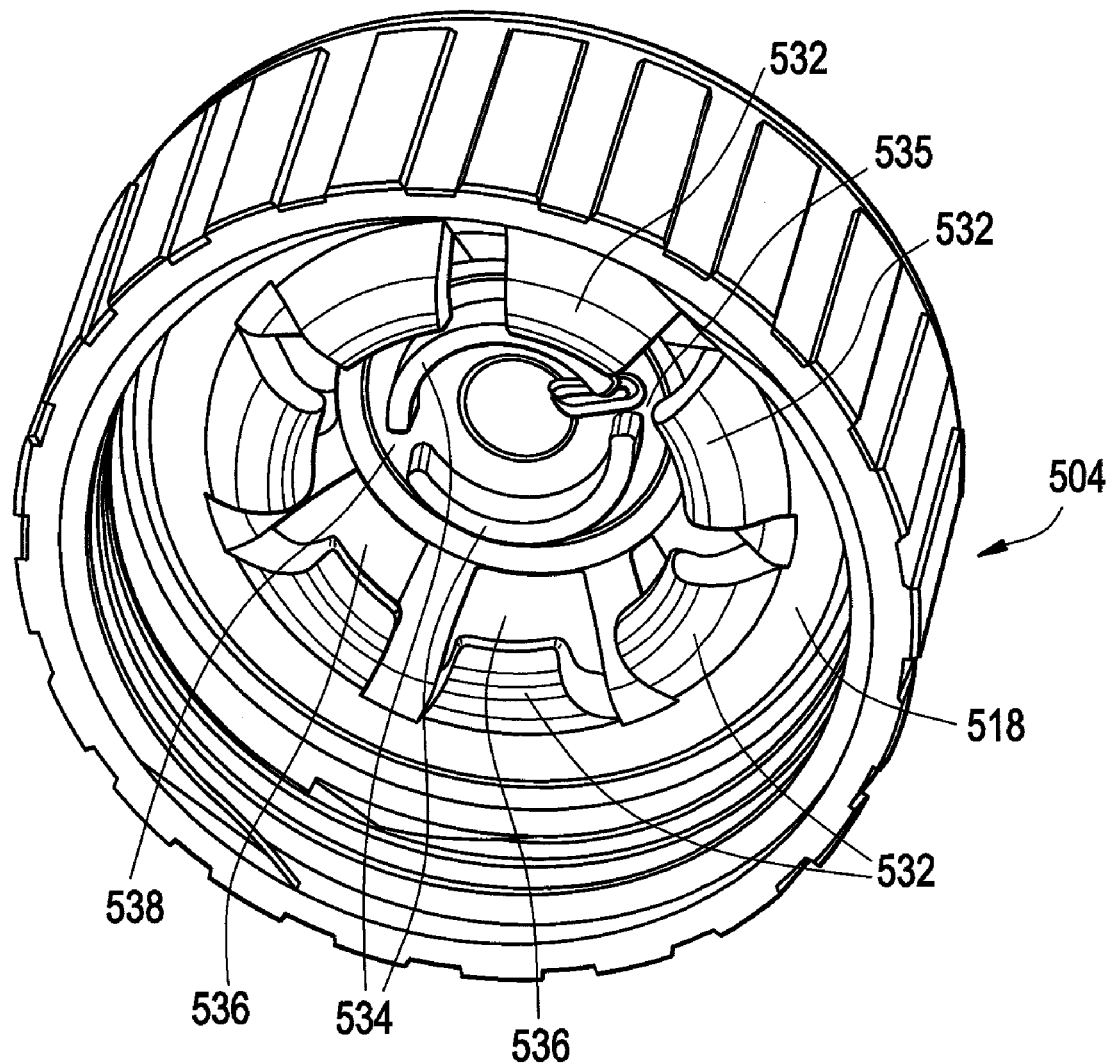
FIG. 42 is a bottom perspective view of a cap component of the alternative embodiment shown in FIGS. 37 and 38.

As shown in FIG. 42, the underside 518 of the cap 504 also includes structure 534, such as slotted depending cylinder segments, which is configured to arrest the diaphragm's upward excursion when the diaphragm 502 balloons under pressure. Proximate the fingers 532 are openings 536 in the cap 504 through which the contact lens case 500 ultimately vents when the slit 514 in the diaphragm 502 opens under pressure.

The top portion 522 of the stem 506 also includes passageways 537 which allow gas in the cup 510 to travel through the passageways 537 and exert pressure on the dome portion 512 of the diaphragm 502. As pressure in the cup 510 expands the dome portion 512 of the diaphragm 502, the dome 512 rises and contacts the depending cylinder segments 534 on the underside 518 of the cap 504 which first arrest the dome's movement and "ballooning" from internal pressure, and cause the level of pressure required to initiate venting to rise until tension from additional pressure forces the gas to escape through the notch 514 and a gap 538 between the depending cylindrical segments 534 and channel 535, and out the openings 536. Controlling the diaphragm's excursion in this manner also restricts how large the notch 514 can open and thus limits the rate of flow from the cup 510. Depending on the size of the vent notch 514, the diaphragm's durometer and the proximity of the depending cylindrical segments 534, peak pressure can easily be controlled to anywhere up to 50 psi and possibly beyond.

Elastomeric membranes having punctures to allow release of internal pressure from within a contact lens case have been utilized in prior art as shown by Iba in U.S. Pat. No. 5,143,104. However this type of venting system offers little in the way of resistance to conditions in which external pressure exceeded internal pressure such as might occur if a lens case was carried in an airplane when it landed and was therefore subjected to elevated ambient pressure. Under such conditions where elevated external pressure overcomes the vent to equalize internal pressure, reverse air flow through the vent can drive foreign matter and pathogens into the lens case and contaminate lenses stored inside. Kanner in U.S. Pat. No. 5,250,266 solves this problem by providing a supporting seat behind the slit elastomeric membrane to create a one way valve which prevents the slit from inverting under reverse pressure conditions and therefore stops external flow into the lens case. Vent notch 514 in domed portion 512 of diaphragm 502 prevents undesirable reverse flow without requiring provision of an additional supporting seat structure. When subjected to elevated ambient pressure, domed portion 512 responds by forcing vent notch 514 tightly together as deflection of the domed shape in reaction to the external pressure is resisted by the circumferential constraint and support provided by receiving fingers 532 of cap 504. Therefore, as external pressure increases, compression upon vent notch 514 also increases thereby increasing its ability to resist reverse flow and intrusion of foreign matter or pathogens.

While the lower portion 540 of the stem 506 can take basically any shape while employing the diaphragm 502 shown in FIGS. 37, 38, 40 and 41, FIG. 39 illustrates the situation where the lower portion 540 of the stem 506 is provided as being a variation of that of the stems 42, 142 of the contact lens cases 40, 140 previously described. As shown in FIG. 39, the lower portion 540 of the stem 506 can be provided as having relatively flattened back-to-back cages 542, wherein each cage 542 includes a lens-receiving button 544 and openings 545 to allow the passage of solution. Additionally, the stem 506 can be provided as having a modified end portion 546 (see FIG. 39) for retaining a catalyst 548 (see FIGS. 37 and 38). More specifically, the end portion 546 of the stem 506 can be provided as being consistent with that which is disclosed in U.S. Pat. No. 6,148,992, which is hereby incorporated herein by reference in its entirety, and therefore having structure such as notches 561 for retaining a catalyst. Preferably, the receptacles 550 on the stem 506 are identical to the receptacles 179 which are shown in FIG. 23 and which have been previously described.

Figure 43:
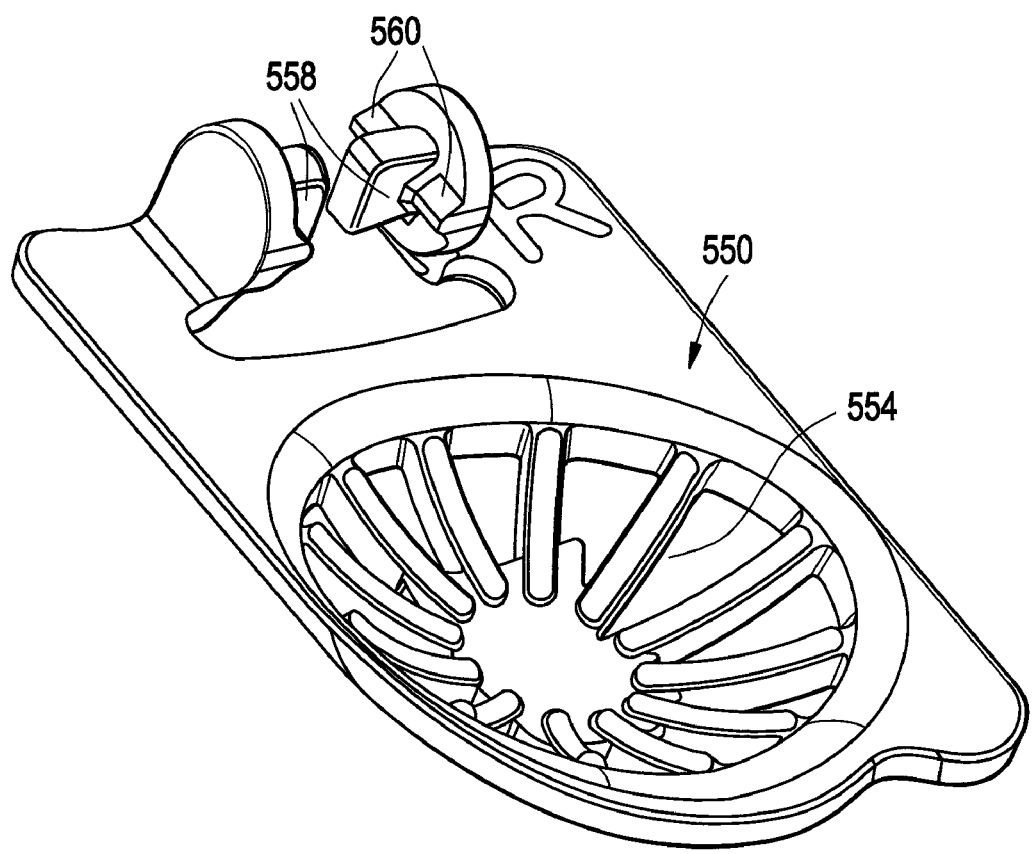
FIG. 43 is a perspective view of a hinged member component of the alternative embodiment shown in FIGS. 37 and 38.

FIG. 43 provides an exemplary illustration of a possible hinged member configuration 550 which can be used with such a stem 506, where the other hinged member 552 (see FIGS. 37 and 38) would be effectively the same but provided for the left contact lens. As shown, each hinged member 550, 552 may include a dome 554 which curves outward, generally away from the lens-receiving button 544 on the stem 506 (rather than being curved inward as in the embodiments previously described), and which includes openings 556 for passage of solution. Preferably, the hinged members 550, 552 include pins 558 and cam followers 560 identical to the pins 177 and cam followers 191 shown in FIG. 20 and function the same way with regard to the receptacles 550 on the stem 506.

Of course, the configuration of the lower portion 540 of the stem 506 shown in FIG. 39 and the configuration of the hinged members 550, 552 shown in FIGS. 37, 38 and 43 can be employed with any of the embodiments previously described, and need not necessarily be employed with the diaphragm 502 shown in FIGS. 37-40 and described hereinabove.

While specific embodiments of the invention are shown and described, it is envisioned that those skilled in the art may devise various modifications without departing from the spirit and scope of the foregoing description.

What is claimed is:

1. A contact lens case comprising: a cup; a cap which engages the cup; a stem; a diaphragm which is disposed between the cap and the stem; a first pivotable member engaged with the stem; a second pivotable member engaged with the stem; each of said first pivotable member and said second pivotable member being pivotable between an open position and a closed position, said first pivotable member comprising a first support ear having a first pin thereon and a second support ear having a second pin thereon, said first support ear and said second support ear being spaced apart from each other and configured to deflect away from each other and come back toward each other as the first pivotable member is moved between its closed position and its open position, wherein the first pin is received in a first receptacle on a first side of the stem, wherein the second pin is received in a second receptacle on a second side of the stem, said second side being opposite said first side, said second pivotable member comprising a third support ear having a third pin thereon and a fourth support ear having a fourth pin thereon, wherein the third pin is received in a third receptacle on the first side of the stem, wherein the fourth pin is received in a fourth receptacle on the second side of the stem, wherein each of the receptacles has a cam surface on a face of the receptacle, wherein each pivotable member has at least one cam follower which is configured to ride along the cam surface, wherein each cam surface comprises a plurality of V-shaped cam notches and a plurality of ramps.

2. A contact lens case as recited in claim 1, wherein the diaphragm seals with a top edge of the cup when the cap is engaged with the cup, and provides a vent which opens when sufficient pressure is reached within the cup.

3. A contact lens case as recited in claim 2, wherein the vent comprises a vent slit on a dome portion of the diaphragm.

4. A contact lens case as recited in claim 1, wherein the diaphragm engages both the stem and the cap in a snap fit arrangement.

5. A contact lens case as recited in claim 1, wherein the diaphragm is configured such that the diaphragm secures the cap and the stem together.

6. A contact lens case as recited in claim 1, wherein the diaphragm comprises a stem-receiving pocket which is configured to receive a portion of the stem, and wherein said diaphragm comprises an undercut which engages under a shoulder of the stem.

7. A contact lens case as recited in claim 1, wherein the diaphragm comprises a dome portion and a vent is provided on the dome portion, further comprising a lip which receives fingers on an underside of the cap, wherein the fingers are configured to prevent the vent from inverting under reverse pressure conditions and therefore stops external flow through the vent into the contact lens case.

8. A contact lens case as recited in claim 7, wherein the cap comprises vent openings proximate the fingers through which the contact lens ease vents when the vent in the diaphragm opens.

9. A contact lens case as recited in claim 1, wherein the cap comprises segments which are configured to arrest excursion of the diaphragm.

10. A contact lens case as recited in claim 1, wherein the diaphragm comprises a dome portion, and a vent is provided on the dome portion, wherein the stem comprises passageways which allow gas in the cup to travel to the dome portion of the diaphragm and out the vent in the diaphragm.

11. A contact lens case comprising: a cup; a cap which engages the cup; a stem; a diaphragm which is disposed between the cap and the stem; two pivotable members engaged with the stem, said pivotable members pivotable between an open position and a closed position, said two pivotable members comprising a first pivotable member and a second pivotable member, said first pivotable member comprising a first support ear having a first pin thereon and a second support ear having a second pin thereon, said first support ear and said second support ear being spaced apart from each other and configured to deflect away from each other and come back toward each other as the first pivotable member is moved between its closed position and its open position, wherein the first pin is received in a first receptacle on a first side of the stem, wherein the second pin is received in a second receptacle on a second side of the stem, said second side being opposite said first side, said second pivotable member comprising a third support ear having a third pin thereon and a fourth support ear having a fourth pin thereon, wherein the third pin is received in a third receptacle on the first side of the stem, and wherein the fourth pin is received in a fourth receptacle on the second side of the stem, wherein an end of the stem is configured to insert into an aperture in a catalyst and retain the catalyst thereon, wherein the first and second receptacles are distinct and spaced away from the third and fourth receptacles.

12. A contact lens case as recited in claim 11, wherein the diaphragm seals with a top edge of the cup when the cap is engaged with the cup, and provides a vent which opens when sufficient pressure is reached within the cup.

13. A contact lens case as recited in claim 12, wherein the vent comprises a notch on a dome portion of the diaphragm.

14. A contact lens case as recited in claim 11, wherein the diaphragm engages both the stem and the cap in a snap fit arrangement.

15. A contact lens case as recited in claim 11, wherein the diaphragm is configured such that the diaphragm secures the cap and the stem together.

16. A contact lens case as recited in claim 11, wherein the diaphragm comprises a stem-receiving pocket which is configured to receive a portion of the stem, and wherein said diaphragm comprises an undercut which engages under a shoulder of the stem.

17. A contact lens case as recited in claim 11, wherein the diaphragm comprises a dome portion and a vent is provided on the dome portion, further comprising a lip which receives fingers on an underside of the cap, wherein the fingers are configured to prevent the vent from inverting under reverse pressure conditions and therefore stops external flow through the vent into the contact lens case.

18. A contact lens case as recited in claim 17, wherein the cap comprises vent openings proximate the fingers through which the contact lens case vents when the vent in the diaphragm opens.

19. A contact lens case as recited in claim 11, wherein the cap comprises segments which are configured to arrest excursion of the diaphragm.

20. A contact lens case as recited in claim 11, wherein the diaphragm comprises a dome portion, and a vent is provided on the dome portion, wherein the stem comprises passageways which allow gas in the cup to travel to the dome portion of the diaphragm and out the vent in the diaphragm.

* * * * *